(12) United States Patent
Son et al.

(10) Patent No.: US 10,996,809 B2
(45) Date of Patent: May 4, 2021

(54) DISPLAY DEVICE AND METHOD OF DRIVING THE SAME

(71) Applicant: SAMSUNG DISPLAY CO., LTD., Yongin-si (KR)

(72) Inventors: Ho Seok Son, Yongin-si (KR); Myoung Ho Kwon, Yongin-si (KR); Jeong Kug Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/746,100

(22) Filed: Jan. 17, 2020

(65) Prior Publication Data

US 2020/0326800 A1 Oct. 15, 2020

(30) Foreign Application Priority Data

Apr. 15, 2019 (KR) .......................... 10-2019-0043923

(51) Int. Cl.
*G06F 3/047* (2006.01)
*G06F 3/041* (2006.01)

(52) U.S. Cl.
CPC ............ *G06F 3/047* (2013.01); *G06F 3/0412* (2013.01); *G06F 3/04184* (2019.05); *G06F 3/041662* (2019.05)

(58) Field of Classification Search
CPC ............... G06F 3/0412; G06F 3/04184; G06F 3/041662; G06F 3/047
See application file for complete search history.

(56) References Cited

U.S. PATENT DOCUMENTS

| 9,355,585 | B2 | 5/2016 | Tripathi et al. |
| 9,407,964 | B2* | 8/2016 | Somasundaram .......................... H04N 21/47217 |
| 10,248,257 | B2 | 4/2019 | Yeh et al. |
| 2009/0122030 | A1* | 5/2009 | Morimoto ............. G06F 3/0321 345/179 |
| 2013/0111379 | A1 | 5/2013 | Hong et al. |
| 2013/0257752 | A1* | 10/2013 | Tripathi ................ G06T 19/006 345/173 |
| 2016/0077617 | A1 | 3/2016 | Lee |

(Continued)

FOREIGN PATENT DOCUMENTS

| KR | 1020180112073 A | 10/2018 |
| WO | 2018004866 A1 | 1/2018 |

OTHER PUBLICATIONS

The extended European search report for EP Application No. 20164364.0 dated Sep. 8, 2020, citing the above reference(s).

*Primary Examiner* — Muhammad N Edun
(74) *Attorney, Agent, or Firm* — Cantor Colburn LLP

(57) ABSTRACT

A display device includes a display portion, a display driver, a touch sensing portion, and a touch driver. The display portion includes data lines, scan lines, and pixels connected to the data lines and the scan lines. The display driver provides data signals to the data lines and sequentially provides scan signals to the scan lines. The touch sensing portion includes sensing electrodes. The touch driver senses a touch input based on a change of a capacitance between the sensing electrodes and calculates a movement speed of the touch input. When the movement speed of the touch input is greater than a reference speed, a first period in which the scan signals and the data signals are provided is reduced in a frame period in which a frame image is displayed.

19 Claims, 14 Drawing Sheets

(56) References Cited

U.S. PATENT DOCUMENTS

| | | |
|---|---|---|
| 2016/0225349 A1 | 8/2016 | Lee et al. |
| 2018/0004340 A1* | 1/2018 | Yeh ..................... G06F 3/04883 |
| 2018/0091728 A1* | 3/2018 | Brown ..................... H04N 5/91 |
| 2018/0095576 A1 | 4/2018 | Yokoo et al. |
| 2019/0082544 A1 | 3/2019 | Park |
| 2019/0243495 A1* | 8/2019 | Guo ........................ G06F 3/044 |

* cited by examiner

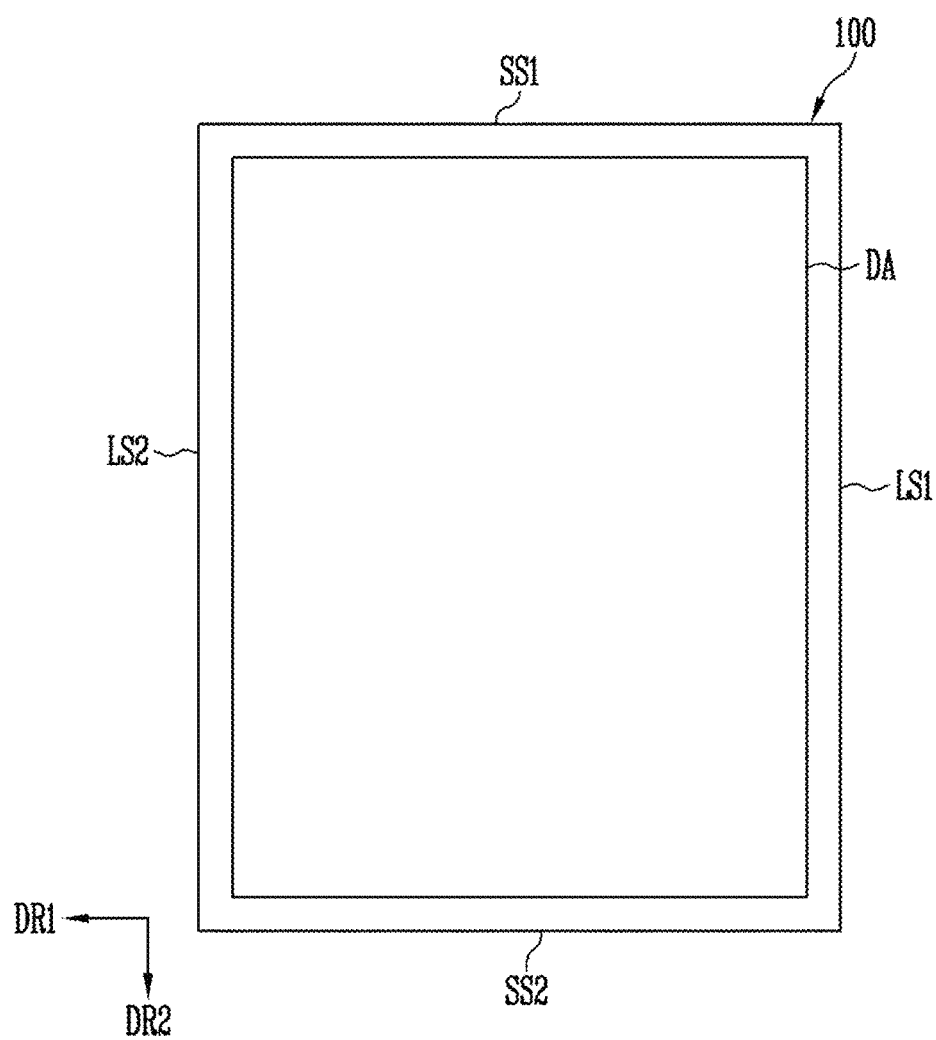

DISPLAY DEVICE AND METHOD OF DRIVING THE SAME

This application claims priority to Korean Patent Application No. 10-2019-0043923, filed on Apr. 15, 2019, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

The display device typically includes a display panel and a driver. The display panel may include scan lines, data lines, and pixels. The driver may include a scan driver for sequentially providing scan signals to the scan lines and a data driver for providing data signals to the data lines. Each of the pixels may emit light at a luminance corresponding to a data signal provided through the corresponding data line in response to the scan signal provided through the corresponding scan line.

Such a display device may further include a touch panel and a touch driver, detect a touch input through the touch panel, and display a screen corresponding to the touch input.

SUMMARY

When a scroll screen in which a screen moves in a specific direction is displayed by a touch input, a screen abnormality (for example, image drag) due to a mismatching between a previous frame image displayed through a display device and a reproduced current frame image may occur, and display quality may be degraded.

Embodiments of the disclosure are directed to a display device with improved display quality and a method of driving the display device.

In an embodiment of the disclosure, a display device includes a display portion including data lines, scan lines, and pixels connected to the data lines and the scan lines, a display driver which provides data signals to the data lines and sequentially provides scan signals to the scan lines, a touch sensing portion including sensing electrodes, and a touch driver which senses a touch input based on a change of a capacitance between the sensing electrodes and calculates a movement speed of the touch input. In such an embodiment, when the movement speed of the touch input is greater than a reference speed, a first period in which the scan signals and the data signals are provided is reduced in a frame period in which a frame image is displayed.

According to an embodiment, each of the scan signal may be synchronized with a horizontal synchronization signal, a period of the horizontal synchronization signal may be reduced, when the movement speed of the touch input is greater than the reference speed, and the horizontal synchronization signal may define starts of each of data rows included in frame data corresponding to the frame image.

According to an embodiment, the display device may further include a processor which generates the horizontal synchronization signal. In such an embodiment, the touch driver may provide a sensing signal to the processor when the movement speed of the touch input is greater than the reference speed, and the processor may reduce the period of the horizontal synchronization signal based on the sensing signal.

According to an embodiment, a refresh rate of the frame image may be constant.

According to an embodiment, the first period may be within a range of about 80% to 90% of a reference time when the movement speed of the touch input is greater than the reference speed, and the reference time may be a period in which the scan signals and the data signals are provided when the movement speed of the touch input is less than the reference speed.

According to an embodiment, when the movement speed of the touch input is greater than the reference speed, a switching speed of the data signals may be increased in the frame period.

According to an embodiment, the frame period may include a second period between the first period thereof and a first period of an adjacent frame period, the adjacent frame period may be a frame period adjacent to the frame period, and the second period may be increased when the movement speed of the touch input is greater than the reference speed.

According to an embodiment, the frame period may include a second period between the first period thereof and a first period of an adjacent frame period, the adjacent frame period may be a frame period adjacent to the frame period, and the second period may be constant or reduced.

According to an embodiment, the display portion may further include light emission control lines, the display driver may sequentially provide light emission control signals to the light emission control lines, and the pixels may be connected to the light emission control lines and sequentially emit light based on the light emission control signals.

According to an embodiment, the data lines may extend in a first direction and may be arranged along a second direction intersecting the first direction, the scan lines may extend in the second direction and may be arranged along the first direction, and the display portion may be foldable based on a folding axis extending in the second direction.

According to an embodiment, the scan signals may be sequentially provided to the scan lines along the first direction, and the pixels may sequentially emit light in response to the scan signals.

According to an embodiment, the touch driver may calculate the movement speed of the touch input, and the movement speed may be a speed of the touch input in the second direction.

In an embodiment of the disclosure, a display device includes a display portion including data lines, scan lines, and pixels connected to the data lines and the scan lines, where the display portion displays a frame image through the pixels, a display driver which provides data signals to the data lines and sequentially provides scan signals to the scan lines, a touch sensing portion including sensing electrodes, a touch driver which senses a touch input based on a change of a capacitance between the sensing electrodes and generates a sensing signal when a movement speed of the touch input is greater than a reference speed, and a processor which varies a refresh rate of the frame image based on the sensing signal.

According to an embodiment, a frame period in which the frame image is displayed may include a first period in which the scan signals and the data signals are provided, and a second period between the first period and a first period of an adjacent frame period, the adjacent frame period may be a frame period adjacent to the frame period, and the processor may reduce the first period.

According to an embodiment, the processor may reduce the second period.

According to an embodiment, a frame period in which the frame image is displayed may include a first period in which the scan signals and the data signals are provided, and a second period positioned between the first period and a first period of an adjacent frame period, the adjacent frame period may be a frame period adjacent to the frame period, and the processor may reduce the second period.

According to an embodiment, the scan signals may be sequentially provided along a first direction, the touch driver may generate the sensing signal when the movement speed of the touch input in a second direction is greater than the reference speed, and the second direction may intersect the first direction.

In an embodiment of the disclosure, a method of driving a display device includes sensing a touch input through a touch sensing portion of the display device, determining whether or not a movement speed of the touch input is greater than a reference speed through the touch sensing portion, increasing a porch period when the movement speed of the touch input is greater than the reference speed in a processor, and displaying frame images based on the porch period on a display portion of the display device. In such an embodiment, a second frame image among the frame images is started to be displayed at a time point at which the porch period is elapsed from a time point at which display of a first frame image among the frame images is ended.

According to an embodiment, a refresh rate of the frame images may be constant.

According to an embodiment, the increasing the porch period may further include reducing an update time of frame data corresponding to each of the frame images.

In an embodiment of the disclosure, a display device includes a display portion including data lines, scan lines, and pixels connected to the data lines and the scan lines, where the display portion displays frame images through the pixels, a display driver which provides data signals to the data lines and sequentially provides scan signals to the scan lines, a sensor which generates attitude information by sensing an attitude or a rotation of the display portion, and a processor which varies a porch period of the frame images based on the attitude information. In such an embodiment, the porch period is a period between a time point at which display of a first frame image among the frame images is ended and a time point at which a second frame image adjacent to the first frame image is started to be displayed.

According to an embodiment, the processor may determine a screen orientation based on the attitude information, increase the porch period when the screen orientation is a first screen orientation, and the screen orientation may be a direction in which an upper portion or a lower portion of each of the frame images is positioned with respect to the display portion.

According to an embodiment, the scan lines may be arranged along a first direction, each of the scan lines may extend in a second direction, and the first screen orientation may be in the second direction.

According to embodiments of the display device and the method of driving the display device, a width of the frame period in which one frame image is displayed is constantly maintained and the porch period is increased when images corresponding to a screen scroll is displayed. Therefore, in such embodiments, a display period in the frame period may be reduced, the data signal may be more quickly updated or switched during the reduced display period, and one complete frame image may be more quickly displayed. In such embodiments, a screen abnormality that is visually recognized by a user while the scroll screen is displayed may be reduced, and display quality may be improved.

In such embodiments, the display device and the method of driving the display device may minimize an increase of power consumption by fixing the width of the frame period and reducing only the display period.

BRIEF DESCRIPTION OF THE DRAWINGS

The above and other features of the invention will become more apparent by describing in further detail exemplary embodiments thereof with reference to the accompanying drawings, in which:

FIG. 1 is a diagram illustrating a display device according to an embodiment of the disclosure;

DETAILED DESCRIPTION OF THE EMBODIMENT

Figure 2A:
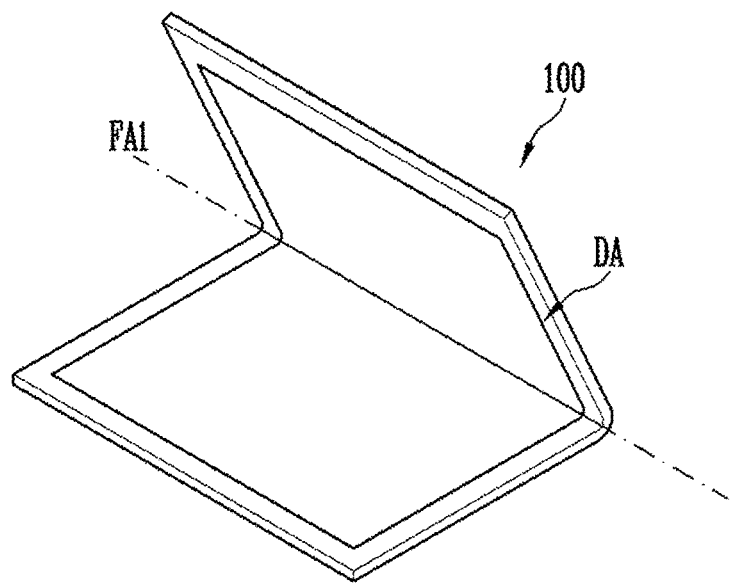
FIGS. 2A to 2D are diagrams illustrating the display device of FIG. 1 in various states.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a diagram illustrating a display device according to an embodiment of the disclosure.

Referring to FIG. 1, an embodiment of the display device 100 includes a display area DA.

The display area DA may receive a data signal corresponding to an image data and display an image corresponding to a data signal. In such an embodiment, the display area DA may sense a touch input (for example, a touch input by a finger of a user, a touch member, etc.).

The display device 100 may have a rectangular shape in a plan view. Herein, the term "in a plan view" may means "when viewed from a plan view in a thickness direction thereof." The display device 100 may include opposing long sides (for example, a first long side LS1 and a second long side LS2 extending in a second direction DR2) and opposing short sides (for example, a first short side SS1 and a second short side SS2 extending in a first direction (DR1). Corners where the long sides LS1 and LS2 of the display device 100 meet the short sides SS1 and SS2 may be right angled but the disclosure is not limited thereto. In an alternative embodiment, the corners may be curved or rounded. A planar shape of the display device 100 is not limited to that illustrated in FIG. 1, but may be variously modified, e.g., to have circular or some other shapes.

The display device 100 may be a flexible display device. In one embodiment, for example, at least one area of the display device 100 may be flexible in a way such that the display device 100 may be bendable, foldable, and/or rollable.

In an embodiment, the display device 100 may effectively display an image in the entire display area DA in a non-deformed state, for example, in a flat spread state. In such an embodiment, the display device 100 may display an image only in an area of a part of the display area DA, for example, an area of a part of an area exposed to the user, in a deformed state, for example, in a bended, folded and/or rolled state.

FIGS. 2A to 2D are diagrams illustrating the display device of FIG. 1 in various states. FIG. 1 illustrates a display device in an unfolded state, FIGS. 2A to 2D illustrate a display device in a folded state.

Referring first to FIGS. 1 and 2A, an embodiment of the display device 100 may be in-folded. In one embodiment, for example, the display device 100 may be folded in a way such that the display area DA faces an inside with respect to a first folding axis FA1. The first folding axis FA1 may be perpendicular to or intersect the opposing sides (for example, the first short side SS1 and the second short side SS2) of the display device 100, but not being limited thereto.

In such an embodiment, the display device 100 may be an in-foldable display device. However, embodiments of the display device 100 are not limited thereto.

Figure 2B:
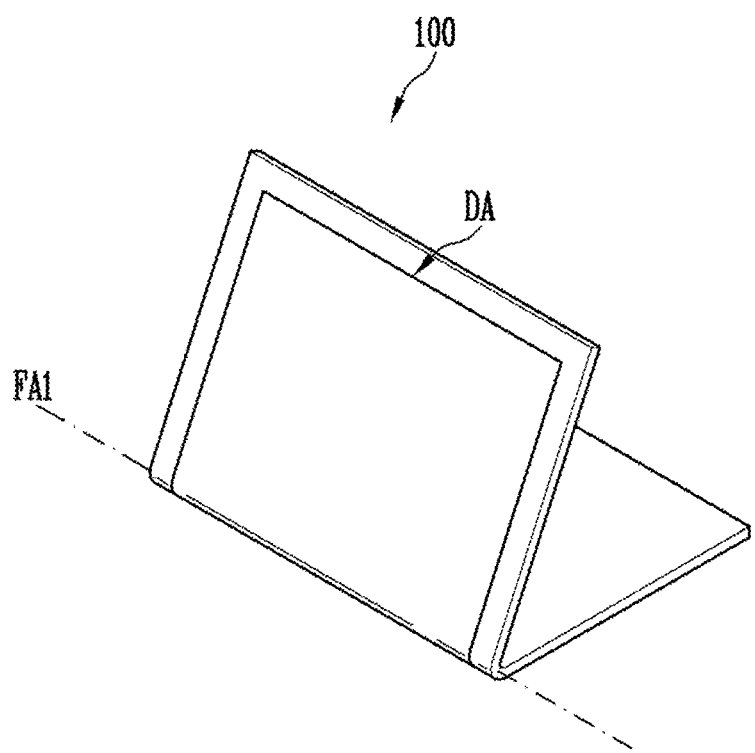

Referring to FIGS. 1 and 2B, an embodiment of the display device 100 may be out-folded. In one embodiment, for example, the display device 100 may be out-folded in a way such that the display area DA faces an outside with respect to the first folding axis FA1. In such an embodiment, the image is displayed through a front surface of the display device 100, and when the display device 100 is folded, rear surfaces of the display device 100 may be relatively adjacent or in contact with each other. In such an embodiment, the display device 100 may be an out-foldable display device.

In an embodiment, the display device 100 may be folded at a plurality of mutually different areas.

Figure 2C:
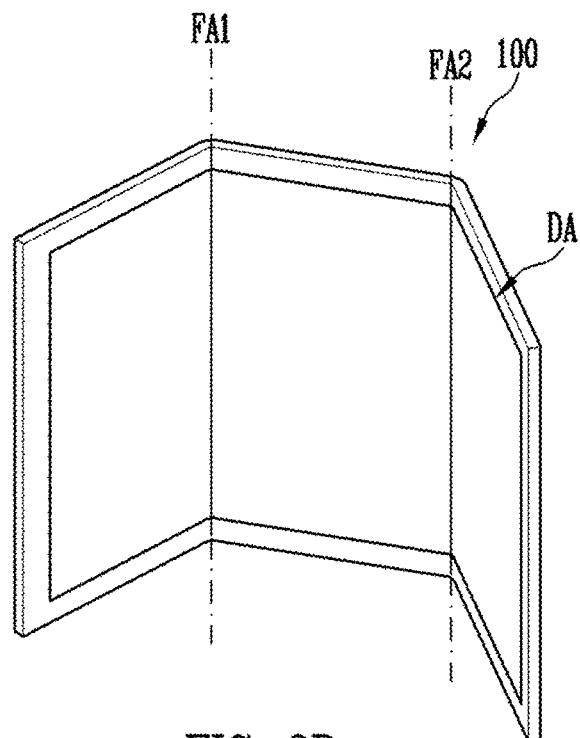

Referring to FIG. 2C, an embodiment of the display device 100 may be in-folded in a way such that the display area DA faces the inside with respect to the first folding axis FA1 and a second folding axis FA2.

Figure 2D:
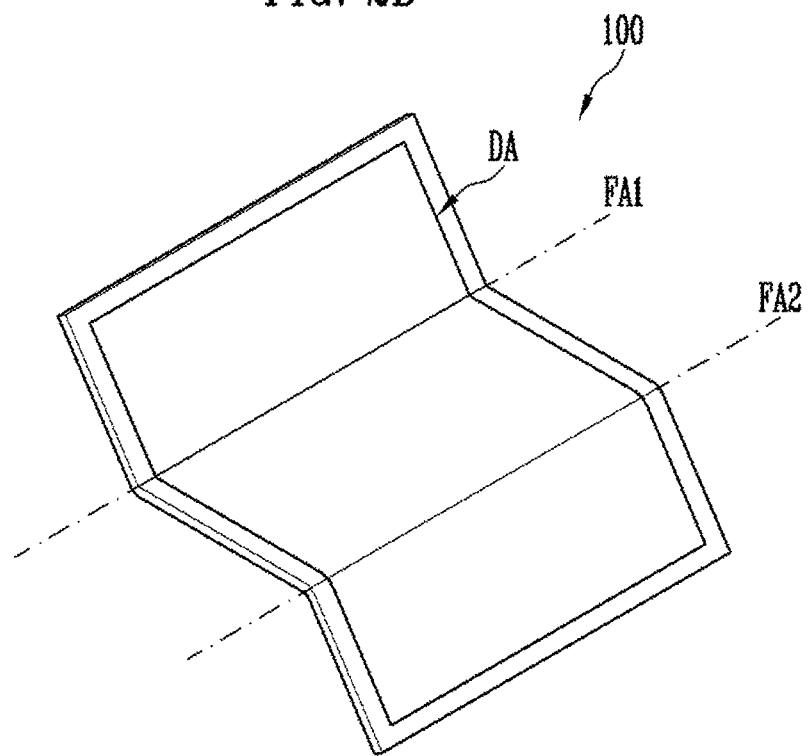

Referring to FIG. 2D, an embodiment of the display device 100 may be folded in a way such that the display area DA faces the inside with respect to the first folding axis FA1, and may be further folded in a way such that the display area DA faces the outside with respect to the second folding axis FA2.

In an alternative embodiment, although not shown, the display device 100 may be a rollable display device. In one embodiment, for example, the display device 100 may be rolled in a way such that the display area DA faces the outside or the display area DA faces the inside. In such an embodiment, at least one area of the display device 100 may be rolled, and a rolling direction is not particularly limited.

Figure 3:
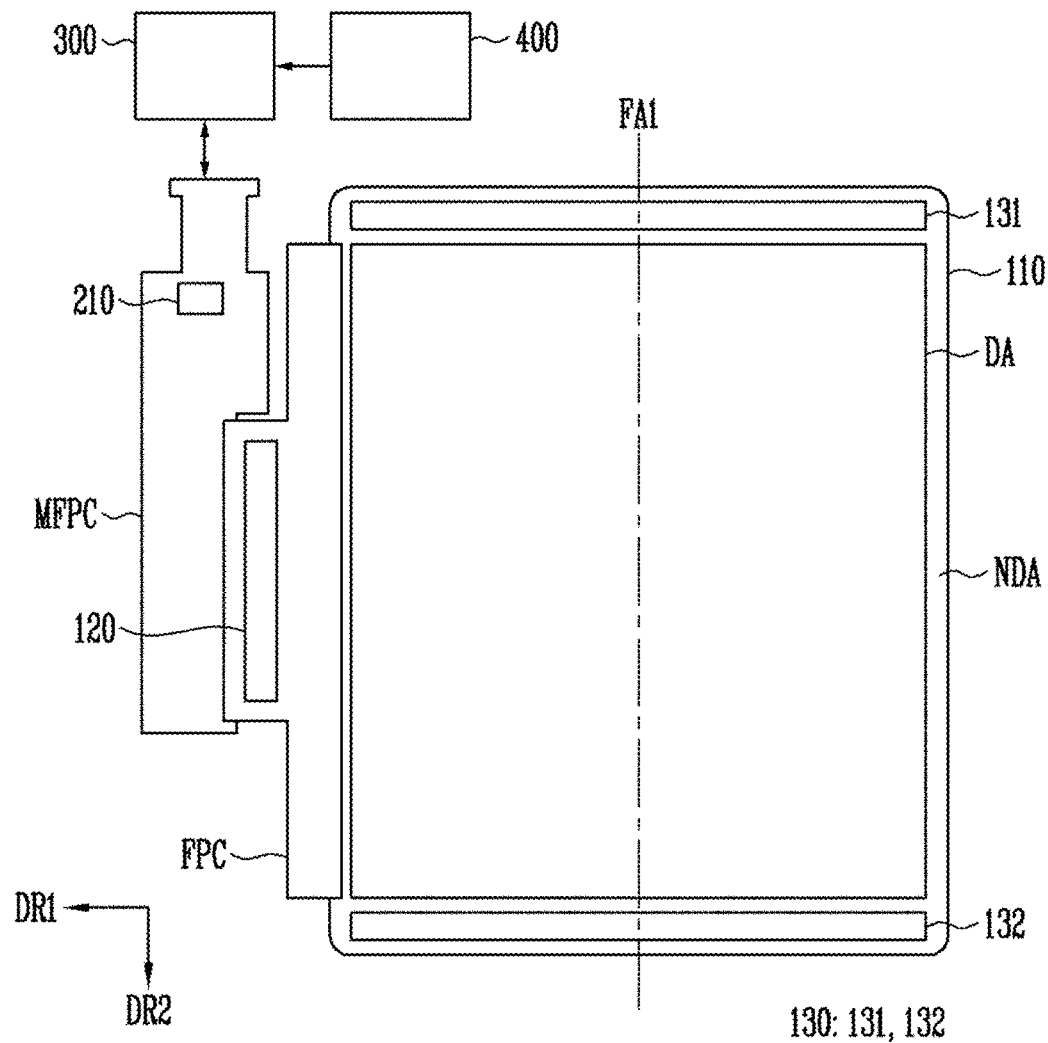
FIG. 3 is a plan view illustrating an exemplary embodiment of the display device of FIG. 1.

FIG. 3 is a plan view illustrating an exemplary embodiment of the display device of FIG. 1.

Referring to FIGS. 1 and 3, an embodiment of the display device 100 may include a display panel 110 (or a panel), a display driver, a touch driver 210, a processor 300, and a sensor 400 (or an attitude sensor). In such an embodiment, the display device 100 may further include a flexible printed circuit board FPC and a main circuit board MFPC.

The display panel 110 may be a flexible display panel. In such an embodiment, the display panel 110 may be configured to be bendable, foldable, and/or rollable. In an embodiment, as described above with reference to FIG. 2A, the display panel 110 may be in-folded with respect to the first folding axis FA1. However, such an embodiment is merely exemplary, and embodiments of the display panel 110 are not limited thereto.

The display panel 110 may include the display area DA for displaying the image and a non-display area NDA outside the display area DA. In an embodiment, the display panel 110 may include pixels disposed in the display area DA. In such an embodiment, the display panel 110 may include sensing electrodes for sensing the touch input. The display panel 110 will be described later in greater detail with reference to FIG. 4.

The display driver may include a first driver 120 and a second driver 130.

In an embodiment, the first driver 120 may receive control signal and input data (or raw image data) from the processor 300, generate the data signal based on the control signal and the input data, and provide the data signal to the display panel 110. In such an embodiment, the first driver 120 may generate a scan control signal (and a light emission control signal) based on the control signal, and may provide the scan control signal to the second driver 130.

The first driver 120 may be implemented as an integrated circuit, may be mounted on the flexible printed circuit board FPC (or mounted on a circuit film (not shown) and connected to the flexible printed circuit board FPC), and may be connected to the display panel 110.

The first driver 120 (and the flexible printed circuit board FPC) may be disposed adjacent to one long side (for example, the second long side LS2 (refer to FIG. 1) of the display panel 110) and may be connected or coupled to the one long side of the display panel 110.

In an embodiment, the second driver 130 may sequentially generate the scan signals based on the scan control signal and provide the scan signals to the display panel 110. The second driver 130 may include a first sub-driver 131 and a second sub-driver 132. The first sub-driver 131 may be disposed adjacent to one short side of the display panel 110 (for example, the first short side SS1 (refer to FIG. 1) of the display panel 110 and the second sub-driver 132 may be disposed adjacent to the other short side (for example, the second short side SS2 (refer to FIG. 1)).

In an embodiment, when the second driver 130 receives a light emission driving control signal, the second driver 130 may generate the light emission control signal based on the light emission driving control signal, and provide the light emission control signal to the display panel 110. In an embodiment, the display panel 110 may receive the data signal in response to the scan signal, and display the image corresponding to the data signal in response to the light emission control signal.

In one embodiment, for example, the first sub-driver 131 may be a scan driver for generating the scan signal, and the second sub-driver 132 may be an emission driver for generating the light emission control signal. In one alternative embodiment, for example, each of the first sub-driver 131 and the second sub-driver 132 may include the scan driver and the light emission driver.

The second driver 130 (or a second driving circuit) may be disposed in the non-display area NDA of the display panel 110. However, the first driver 120 and the second driver 130 are not limited thereto.

The touch driver 210 may generate a touch driving signal, provide the touch driving signal to the display panel 110 (or the sensing electrode included in the display panel 110), receive a sensing signal corresponding to the touch driving signal, and sense the touch input based on the sensing signal. In one embodiment, for example, the touch driver 210 may sense the touch input based on a change of a capacitance between the sensing electrodes included in the display panel 110. In an embodiment, the touch driver 210 may provide information on the sensed touch input (for example, a magnitude, coordinates, and the like of the touch input) to the processor 300.

In an embodiment, the touch driver 210 may calculate a movement speed of the touch input, and determine whether or not the movement speed of the touch input is greater than a reference speed. In such an embodiment, when the movement speed of the touch input is greater than the reference speed, the touch driver 210 may provide the sensing signal (or sensing information) to the processor 300. Here, the sensing signal indicates whether or not the movement speed of the touch input is greater than the reference speed, and may indicate a magnitude, a direction, and the like of the movement speed. Herein, the movement speed of the touch input means a distance between positions of the touch input per a unit time.

The touch driver 210 will be described later in greater detail with reference to FIGS. 7 and 8.

The touch driver 210 may be implemented as an integrated circuit, may be mounted on the main circuit board MFPC, and may be connected to the display panel 110 through the flexible printed circuit board FPC.

The processor 300 may generate the control signal and the input data, and provide the control signal and the input data to the display driver (or the first driver 120) through the main circuit board MFPC. In an embodiment, the processor 300 may generate the input data based on the information on the touch input provided from the touch driver 210.

In an embodiment, the processor 300 may generate the control signal based on the sensing signal provided from the touch driver 210. In one embodiment, for example, when the processor 300 receives the sensing signal indicating that the movement speed of the touch input is greater than the reference speed, the processor 300 may determine that the user is fastly scrolling the image (or a screen) displayed on the display area DA of the display panel 110, and may adjust a driving setting value (that is, the control signal) of the display driver. In one embodiment, for example, when the movement speed of the touch input is greater than the reference speed, the processor 300 may reduce a display period (that is, a time duration, in a frame period, during which an image is displayed through the display panel 110). In the display period, the data signal and the scan signal (and the light emission control signal) may be provided to the display panel 110. In one alternative embodiment, for example, when the movement speed of the touch input is greater than the reference speed, the processor 300 may increase a porch period (that is, a time duration between two adjacent display periods).

In an embodiment, the display device 100 may sequentially display frame images, and a frame period (or a frame period allocated to display one frame image), in which one frame image is displayed, may include a display period (or an active period) and the porch period (or a vertical porch period). A start of the frame period (or a start of frame data corresponding to the frame period) may be defined or determined by a vertical synchronization signal (VSYNC in FIG. 9), and a start of data rows included in the frame data may be defined or determined by a horizontal synchronization signal (HSYNC in FIG. 9). The display period of the frame period may be varied by a period (or a frequency) of the horizontal synchronization signal HSYNC, and the porch period may be varied by the period of the horizontal synchronization signal (HSYNC) and a period (or a frequency) of the vertical synchronization signal (VSYNC). In one embodiment, for example, when the period of the vertical synchronization signal (VSYNC) is constant or fixed, the display period may be reduced and the porch period may be increased as the period of the horizontal synchronization signal (HSYNC) is shortened.

Changes of the display period and/or the porch period in the frame period will be described later in greater detail with reference to FIGS. 9 to 11.

In an embodiment, the sensor 400 may be disposed on one side of the display device 100 and sense an attitude (or a physical rotation) of the display device 100 (or the display panel 110) to generate attitude information (or an attitude sensing signal) of the display device 100. In one embodiment, for example, the sensor 400 may be implemented as an attitude sensor such as a gyro sensor, or an acceleration sensor, and may sense an angle (or angular rates) formed by the short side (for example, the second short side SS2 (refer to FIG. 1)) (or the long side) of the display device 100.

In an embodiment, the processor 300 may determine a screen orientation (or an output direction of the screen, and a viewing mode) of the display device 100 based on the attitude information generated in the attitude sensor 400.

Here, the screen orientation may be a direction in which the image is output or displayed based on the display device 100 (or the display panel 110), a direction from an upper portion to a lower portion of the image (for example, a character), and a direction in which the upper portion (or the lower portion) of the image is positioned. The display device 100 may include at least two screen orientations. In one embodiment, for example, a first screen orientation may be in the first direction DR1 with respect to the display device 100 shown in FIG. 3, and the screen orientation may be in the second direction DR2.

In an embodiment, when the screen orientation of the display device 100 is the first screen orientation (or the second direction DR2), the display device 100 may operate in a first viewing mode, and the processor 300 may rotate and/or scale the image data corresponding to the first screen orientation. In one embodiment, for example, the first viewing mode may be a vertical direction viewing mode (or a portrait viewing mode) (for example, a state in which upper and lower sides of the image are short sides).

In an embodiment, when the screen orientation of the display device 100 is the second screen orientation (or the first direction DR1), the display device 100 may operate in a second viewing mode, and the processor 300 may rotate and/or scale the image data corresponding to the second screen orientation. In one embodiment, for example, the second viewing mode may be a horizontal direction viewing mode (or a landscape mode) (for example, a state in which the upper and lower sides of the image are long sides).

In an embodiment, the processor 300 may generate the control signal based on the screen orientation of the display device 100. In one embodiment, for example, when the screen orientation of the display device 100 is the second direction DR2 (or when the display device 100 operates in the first viewing mode (for example, a portrait viewing mode)), the processor 300 may increase the porch period or reduce the display period. In such an embodiment, when the screen orientation of the display device 100 is the first direction DR1 (or when the display device 100 operates in the second viewing mode (for example, a landscape viewing mode)), the processor 300 may reduce the porch period or increase the display period.

In an embodiment, the processor 300 may generate or vary the control signal based on the attitude information of the display device 100.

In an embodiment, as described with reference to FIG. 3, the first driver 120 for generating the data signal may be disposed adjacent to a long side of the display panel 110, and the second driver 130 for generating the scan signal may be disposed adjacent to a short side of the display panel 110.

In an embodiment, the touch driver 210 may determine whether or not the movement speed of the touch input is greater than the reference speed. In such an embodiment, when the movement speed of the touch input is greater than the reference speed, the processor 300 may control the control signal to reduce the display period in the frame period or increase the porch period. In such an embodiment, an update speed of the input data (or the data signal) for the display panel 110 may become faster, and a screen abnormality (for example, a screen drag that occurs on a screen switched by a scroll input) may be improved or alleviated.

Figure 4:
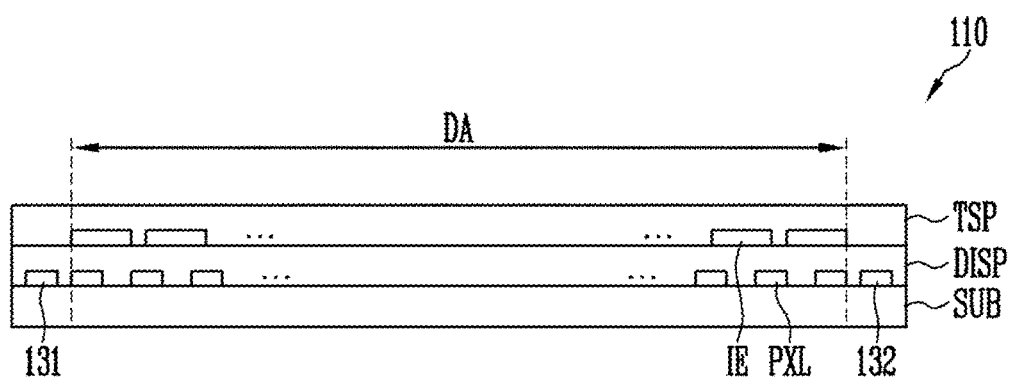
FIG. 4 is a cross-sectional view illustrating an exemplary embodiment of a display panel included in the display device of FIG. 3.

FIG. 4 is a cross-sectional view illustrating an exemplary embodiment of the display panel included in the display device of FIG. 3.

Referring to FIGS. 3 and 4, an embodiment of the display panel 110 may include a substrate SUB, a display portion DISP (or a display layer), and a touch sensing portion TSP (or a touch sensing layer).

Referring to FIGS. 3 and 4, the substrate SUB may be a flexible substrate. The substrate SUB may be formed of or defined by a thin film including a flexible material, or the like. In one embodiment, for example, the substrate SUB may include at least one of polyethersulfone ("PES"), polyacrylate, polyetherimide ("PEI"), polyethylene naphthalate ("PEN"), polyethylene terephthalate ("PET"), polyphenylene sulfide ("PPS"), polyarylate ("PAR"), polyimide ("PI"), polycarbonate ("PC"), triacetate cellulose ("TAC"), and cellulose acetate propionate ("CAP"). However, the material of the substrate SUB is not limited thereto, and the substrate SUB may be formed using a material having flexibility in a predetermined range.

The display portion DISP may be provided or disposed on the substrate SUB. The display portion DISP may include pixels PXL. The pixels PXL may be provided in the display area DA. Each of the pixels PXL may include an organic light emitting diode, but the pixels PXL are not limited thereto.

The display portion DISP may further include the first sub-driver 131 and the second sub-driver 132 (that is, the second driver 130 (refer to FIG. 3)). The first sub-driver 131 and the second sub-driver 132 may be provided in the non-display area NDA. In such an embodiment, the first sub-driver 131 and the second sub-driver 132 may be disposed or formed on the substrate SUB together with the pixels PXL.

In an embodiment, the display portion DISP may include a flexible thin-film encapsulation layer for sealing the pixels PXL. The flexible thin-film encapsulation layer may be an encapsulation layer having a multi-layer film structure including at least one organic film and an inorganic film. In one embodiment, for example, the flexible thin-film encapsulation layer may include first and second inorganic films overlapping each other and at least one organic film interposed between the first and second inorganic films. In one alternative embodiment, for example, the flexible thin-film encapsulation layer may be an encapsulation layer having a single-layer film structure including a complex organic and inorganic material.

In an embodiment, as described above, the display portion DISP is a flexible organic light emitting display panel, but a type and/or a shape of the display portion DISP is not particularly limited.

The touch sensing portion TSP may be disposed on the display portion DISP and may include a sensing electrode IE (or sensing electrodes). The sensing electrode IE may be provided in the display area DA, but not being limited thereto. The sensing electrode IE may be used to sense an external input in a mutual capacitance scheme and/or a self-capacitance scheme. The sensing electrode IE may include a transparent conductive material such as indium tin oxide ("ITO"), indium zinc oxide ("IZO"), indium gallium zinc oxide ("IGZO"), ZnO, and indium tin zinc oxide ("ITZO"), but the sensing electrode IE is not limited thereto. In one embodiment, for example, the sensing electrode IE may include an opaque metallic material.

In an embodiment, as shown in FIG. 4, the touch sensing portion TSP may be directly formed or disposed directly on the display portion DISP, but the touch sensing portion TSP is not limited thereto. In one embodiment, for example, the touch sensing portion TSP may be implemented as a separate panel (for example, a touch panel) and the separate panel of the touch sensing portion TSP may be coupled to the display portion DISP through a separate adhesive layer (for example, OCA, OCR, etc.).

Figure 5:
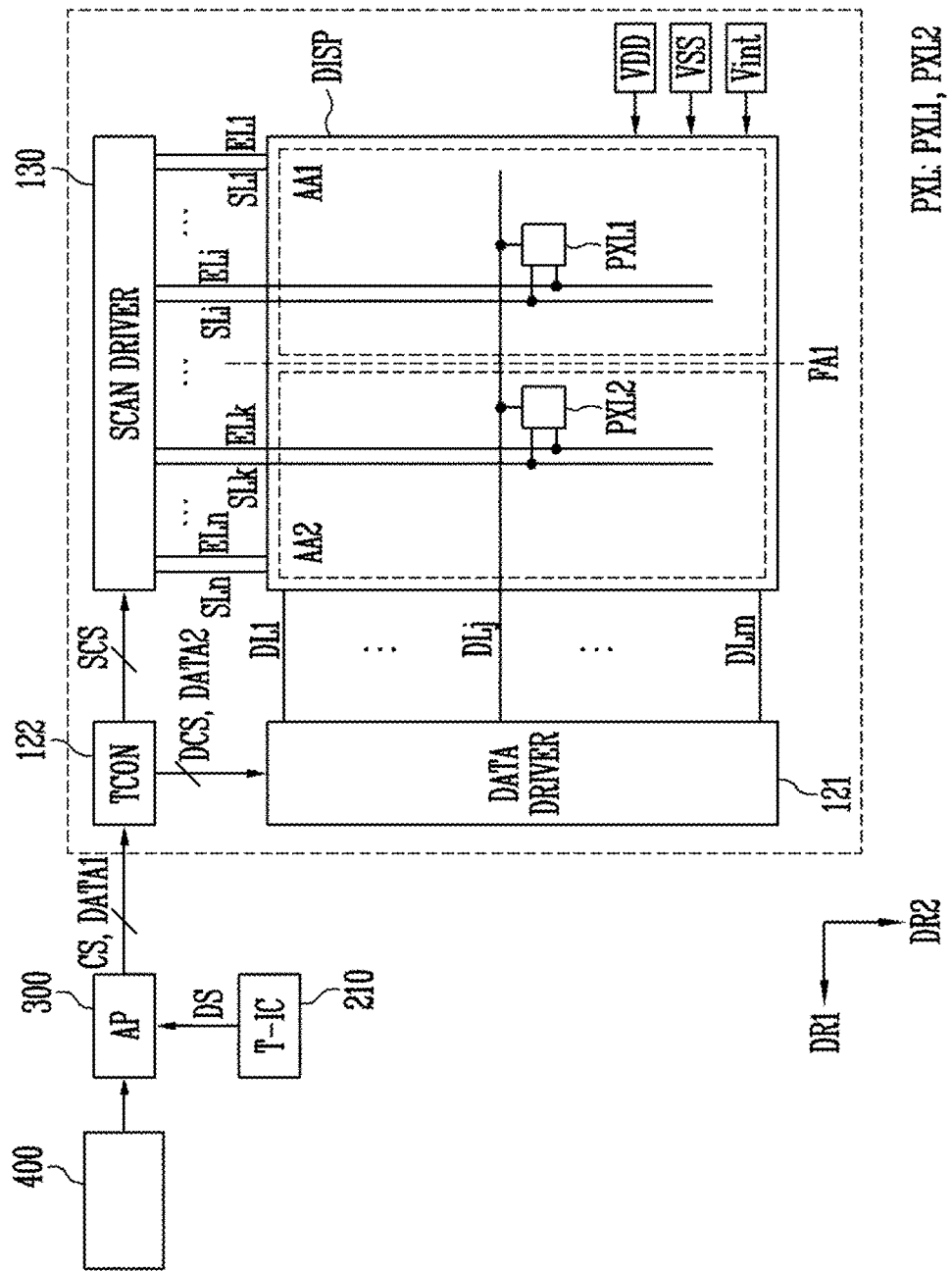
FIG. 5 is a block diagram illustrating an exemplary embodiment of the display device of FIG. 3.

FIG. 5 is a block diagram illustrating an exemplary embodiment of the display device of FIG. 3. FIG. 5 schematically illustrates elements of the display device 100 related to a display function (that is, a configuration for displaying the image) of the display device.

Referring to FIGS. 3 and 5, the display device 100 may include the display portion DISP, a data driver 121, a timing controller 122, and the second driver 130 (or a scan driver and a gate driver).

The display portion DISP may include the display area DA, and the display area DA may be divided into a plurality of display areas AA1 and AA2 with reference to the first folding axis FA1 (that is, a folding axis extending in the second direction DR2). However, this is merely exemplary, and the number of areas (for example, first and second display areas AA1 and AA2) defining the display area DA is not limited thereto.

The display portion DISP may include data lines DL1 to DLm (here, m is a positive integer), scan lines SL1 to SLn (here, n is a positive integer), and the pixels PXL. The pixels PXL may be disposed in areas divided by the data lines DL1 to DLm and the scan lines SL1 to SLn.

Each of the data lines DL1 to DLm may extend in the first direction DR1 and the data lines DL1 to DLm may be arranged along the second direction DR2. The second direction DR2 may intersect or substantially perpendicular to the first direction DR1. Each of the scan lines SL1 to SLn may extend in the second direction DR2 and the scan lines SL1 to SLn may be arranged along the first direction DR1.

According to an embodiment, the data lines DL1 to DLm disposed in the first and second display areas AA1 and AA2 may be continuously disposed between the first and second display areas AA1 and AA2 without disconnection. In one embodiment, for example, the data lines DL1 to DLm may be continuously disposed between the first and second display areas AA1 and AA2.

In an embodiment, the display portion DISP may further include light emission control lines EL1 to ELn. In an embodiment, each of the light emission control lines EL1 to ELn may extend in the second direction DR2 and the light emission control lines EL1 to ELn may be arranged along the first direction DR1.

The pixels PXL may be connected to the data lines DL1 to DLm and the scan lines SL1 to SLn (and the light emission control lines EL1 to ELn). In one embodiment, for example, a first pixel PXL1 may be provided in the first display area AA1, and may be connected to a j-th data line DLj (j is a positive integer), an i-th scan line SLi (i is a positive integer), and an i-th light emission control line ELi. A second pixel PXL2 may be provided in the second display area AA2 and may be may be connected to the j-th data line DLj, a k-th scan line SLk (k is a positive integer), and a k-th light emission control line ELk.

First and second power voltages VDD and VSS may be provided to the display portion DISP. The power voltages VDD and VSS may be voltages for an operation of the pixels PXL, and the first power voltage VDD may have a voltage level higher than a voltage level of the second power voltage VSS. In an embodiment, an initialization power voltage Vint may be provided to the display portion DISP. The first and second power voltages VDD and VSS and the initialization power voltage Vint may be provided from a separate power supply or source to the display portion DISP.

The second driver 130 (or the scan driver) may receive a scan control signal SCS from the timing controller 122 and generate the scan signal in response to the scan control signal SCS. According to an embodiment, the scan control signal SCS may include a start pulse and a clock signal (or a shift clock). The second driver 130 may sequentially generate the scan signals by sequentially shifting the start pulse using the clock signal, and may sequentially provide the scan signals to the scan lines SL1 to SLn.

In an embodiment, a period of the clock signal may be variable. In one embodiment, for example, when a sensing signal DS is provided from the touch driver 210 to the processor 300 (that is, when it is determined that the movement speed of the touch input is greater than the reference speed through the touch driver 210), the timing controller 122 may reduce the period of the clock signal or increase the frequency. In an embodiment, a pulse width of the clock signal may be constantly maintained or fixed, but is not limited thereto. In such an embodiment, when the timing controller 122 reduces the period of the clock signal or increases the frequency, a total time (for example, a total time in which the scan signal is provided in one frame period), in which the scan signal is provided to the display portion DISP, may be reduced, and one complete frame image may be displayed more quickly.

In an embodiment, the second driver 130 may receive the light emission driving control signal from the timing controller 122 and may generate the light emission control signal in response to the light emission driving control signal. The light emission drive control signal may include a light emission start pulse and a light emission clock signal (or a light emission shift clock). The second driver 130 may sequentially generate the light emission control signals by sequentially shifting the light emission start pulse using the light emission clock signal, and may sequentially provide the light emission control signals to the light emission lines EL1 to ELn. A period of the light emission clock signal may be variable, similar to the period of the clock signal (that is, the clock signal for the scan signal).

The data driver 121 may receive a data control signal DCS and a second image data DATA2 from the timing controller 122. The data control signal DCS may include a source start pulse, a source clock signal (or a source shift clock), and a source output enable signal (for example, a data enable signal instructing an output of an effective data signal). The data driver 121 may generate data signals corresponding to the second image data DATA2 using the data control signal DCS and may provide the data signals to the data lines DL1 to DLm.

In an embodiment, a period of the source clock signal may be variable. In one embodiment, for example, when it is determined that the movement speed of the touch input is greater than the reference speed through the touch driver 210, the timing controller 122 may reduce the period of the source clock signal or increase the frequency. In such an embodiment, when the timing controller 122 reduces the period of the source clock signal or increases the frequency, the data signal is provided to the display portion DISP more quickly, and one complete frame image may be displayed more quickly.

The timing controller 122 may receive first image data DATA1 (or input video data) and a control signal CS from the processor 300, generate the scan control signal SCS (and the light emission driving control signal) and the data control signal DCS based on the control signal CS, and generate the second image data DATA2 by converting the first image data DATA1. In an embodiment, the control signal CS may include the vertical synchronization signal (VSYNC), the horizontal synchronization signal (HSYNC), a clock, and the like. In one embodiment, for example, the timing controller 122 may convert the first image data DATA1 of an RGB format into the second image data (DATA2 of an RGBG format that corresponds to a pixel arrangement in the display portion DISP.

In an embodiment, as shown in FIG. 5, the data driver 121 and the timing controller 122 may be separated from each other, but this is merely exemplary and the disclosure is not limited thereto. In one embodiment, for example, the data driver 121 and the timing controller 122 may be implemented as a single integrated circuit (for example, the first driver 120 (refer to FIG. 3)).

The processor 300 may generate the control signal CS for driving the display driver (that is, the timing controller 122, the data driver 121, the second driver 130 and/or the display portion DISP), and the first image data DATA1. According to an embodiment, the processor 300 may be an application processor of a mobile device. However, a type of the processor 300 is not limited thereto, and the processor 300 may be another type of processor matched with a corresponding display device.

In an embodiment, the processor 300 may receive the sensing signal DS from the touch driver 210 and may vary the control signal CS based on the sensing signal DS. In one embodiment, for example, when the processor 300 receives the sensing signal DS, the processor 300 may determine that the user is fastly scrolling the screen of the display device 100 and vary the control signal CS (for example, the period of the horizontal synchronization signal (HSYNC)). In such an embodiment, the timing controller 122 may vary the clock signal, the source clock signal, and the like based on the varied control signal CS, and the display driver and the display portion DISP may operate based on the varied clock signal, source clock signal, and the like.

In an embodiment, the processor 300 may receive the attitude information of the display device 100 (or the display panel 110 (refer to FIG. 3)) from the sensor 400, and may vary the control signal based on the attitude information. In one embodiment, for example, when the short side of the display device 100 is parallel to a horizon, the processor 300 may determine the screen orientation of the display device 100 as the first screen orientation, and may reduce the period of the horizontal synchronization signal (HSYNC) according to the first screen orientation. In such an embodiment, when the long side of the display device 100 is parallel to the horizon, the processor 300 may determine the screen orientation of the display device 100 as the second screen orientation, and may increase the period of the horizontal synchronization signal (HSYNC) according to the second screen orientation.

Figure 6:
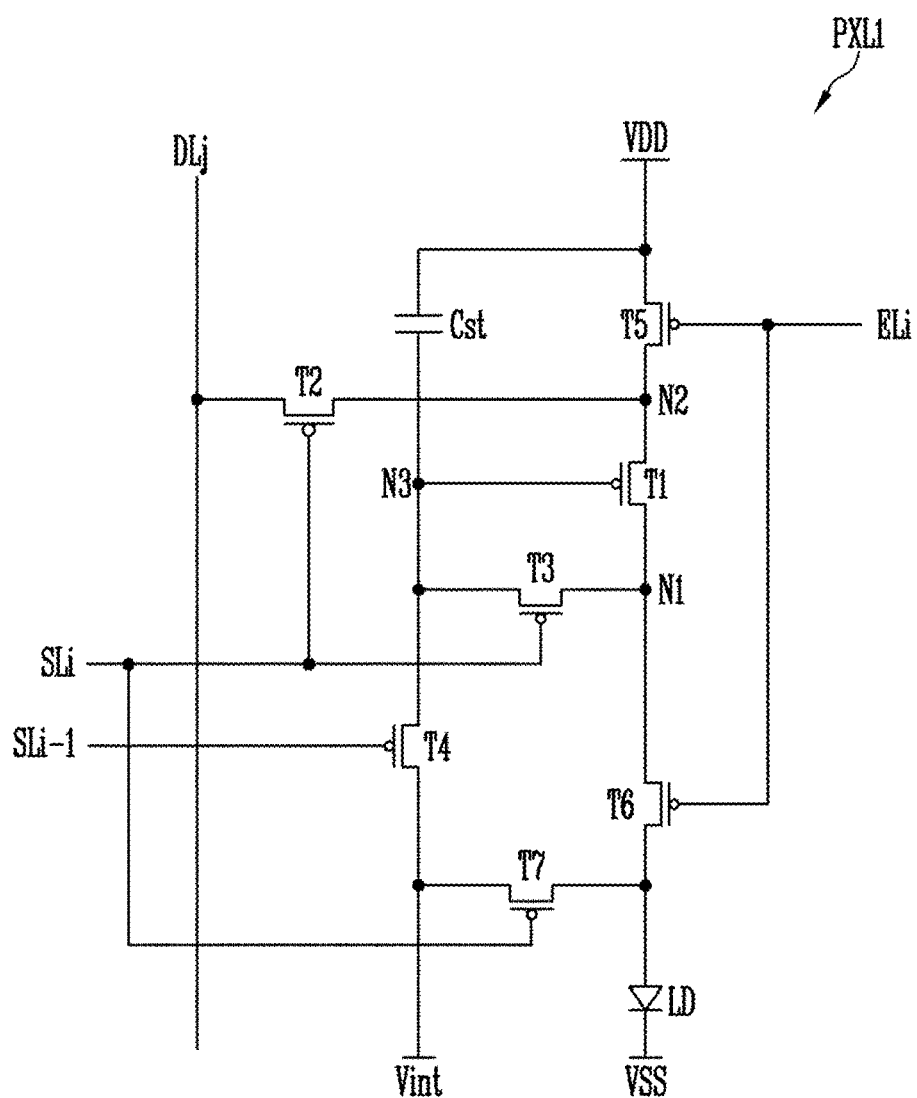
FIG. 6 is a circuit diagram illustrating an exemplary embodiment of a pixel included in the display device of FIG. 5.

FIG. 6 is a circuit diagram illustrating an example of the pixel included in the display device of FIG. 5. In such an embodiment, the pixels PXL included in the display device of FIG. 5 are substantially the same as each other. Accordingly, for convenience of description, the first pixel PXL1 will hereinafter be described in detail, and any repetitive detailed description of other pixels will be omitted.

Referring to FIGS. 5 and 6, the first pixel PXL1 may include first to seventh transistors T1 through T7, a storage capacitor Cst, and a light emitting device LD.

Each of the first to seventh transistors T1 to T7 may be implemented as a P-type transistor, but is not limited thereto. In one embodiment, for example, at least some of the first to seventh transistors T1 to T7 may be implemented as N-type transistors.

A first electrode of the first transistor T1 may be connected to a second node N2 or may be connected to a first power line (that is, a power line to which the first power voltage VDD is applied) through the fifth transistor T5. A second electrode of the first transistor T1 may be connected to a first node N1 or may be connected to an anode of the light emitting device LD through the sixth transistor T6. A gate electrode of the first transistor T1 may be connected to a third node N3. The first transistor T1 may control an amount of current flowing from the first power line to a second power line (that is, a power line for transferring the second power voltage VSS) through the light emitting device LD in correspondence with a voltage of the third node N3.

The second transistor T2 (e.g., a switching transistor) may be connected between the data line DLj and the second node N2. A gate electrode of the second transistor T2 may be connected to the scan line SLi. The second transistor T2 may be turned on when the scan signal is provided to the scan line SLi to electrically connect the data line DLj and the first electrode of the first transistor T1 with each other.

The third transistor T3 may be connected between the first node N1 and the third node N3. A gate electrode of the third transistor T3 may be connected to the scan line SLi. The third transistor T3 may be turned on when the scan signal is provided to the scan line SLi to electrically connect the first node N1 and the third node N3 with each other. Therefore, when the third transistor T3 is turned on, the first transistor T1 may be connected in a diode form.

The storage capacitor Cst may be connected between the first power line and the third node N3. The storage capacitor Cst may store a voltage corresponding to the data signal and a threshold voltage of the first transistor T1.

The fourth transistor T4 may be connected between the third node N3 and an initialization power line (that is, a power line for transferring the initialization power voltage Vint). A gate electrode of the fourth transistor T4 may be connected to a previous scan line SLi−1. The fourth transistor T4 may be turned on when the scan signal is provided to the previous scan line SLi−1 to provide the initialization power voltage Vint to the first node N1. Here, the initialization power voltage Vint may be set to have a voltage level lower than that of the data signal.

The fifth transistor T5 may be connected between the first power line and the second node N2. A gate electrode of the fifth transistor T5 may be connected to the light emission control line ELi. The fifth transistor T5 may be turned off when the light emission control signal is provided to the light emission control line ELi, and may be turned on in other cases.

The sixth transistor T6 may be connected between the first node N1 and the light emitting device LD. A gate electrode of the sixth transistor T6 may be connected to the light emission control line ELi. The sixth transistor T6 may be turned off when the light emission control signal is provided to the light emission control line ELi, and may be turned on otherwise.

The seventh transistor T7 may be connected between the initialization power line and the anode of the light emitting device LD. A gate electrode of the seventh transistor T7 may be connected to the scan line SLi. The seventh transistor T7 may be turned on when the scan signal is provided to the scan line SLi to provide the initialization power voltage Vint to the anode of the light emitting device LD.

The anode of the light emitting device LD may be connected to the first transistor T1 through the sixth transistor T6 and a cathode may be connected to the second power line. The light emitting device LD may generate light with a luminance corresponding to the current provided from the first transistor T1. The first power voltage VDD may be set to have a voltage level higher than that of the second power voltage VSS so that the current flows to the light emitting device LD.

Figure 7:
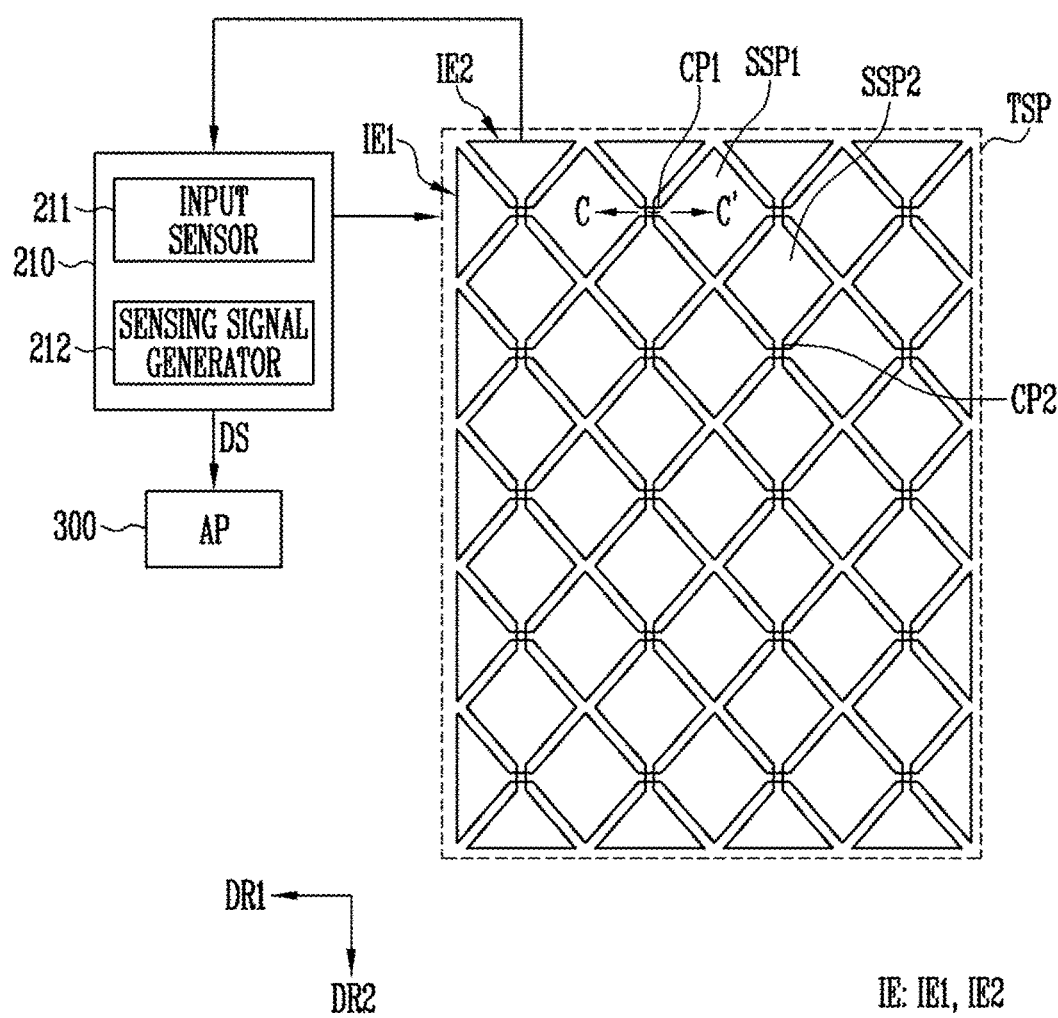
FIG. 7 is a diagram illustrating an exemplary embodiment of the display device of FIG. 3.

FIG. 7 is a diagram illustrating an exemplary embodiment of the display device of FIG. 3. FIG. 7 schematically illustrates elements of the display device 100 related to a touch sensing function (that is, a configuration for sensing the touch input) of the display device.

Referring to FIGS. 3 and 7, the display device 100 may include the touch sensor portion TSP and the touch driver 210.

The touch sensing portion TSP may include first sensing electrodes IE1, first signal lines (not shown) connected to the first sensing electrodes IE1, second sensing electrodes IE2, and second signal lines (not shown) connected to the second sensing electrodes IE2.

In an embodiment, the first sensing electrodes IE1 and the second sensing electrodes IE2 may intersect with each other. The first sensing electrodes IE1 may be arranged along the second direction DR2 and each of the first sensing electrodes IE1 may extend in the first direction DR1. The second sensing electrodes IE2 may be arranged along the first direction DR1 and each of the second sensing electrodes IE2 may extend in the second direction DR2. The first and second sensing electrodes IE1 and IE2 may sense an external input by a mutual capacitance method and/or a self-capacitance method.

The first and second sensing electrodes IE1 and IE2 may include a transparent conductive material such as ITO and IZO, but not being limited thereto. In one embodiment, for example, the first and second sensing electrodes IE1 and IE2 may include conductive fine wires including an opaque metal, and each of the first and second sensing electrodes IE1 and IE2 may have a mesh structure (or a mesh pattern).

Each of the first sensing electrodes IE1 may include a first sensor portion SSP1 and a first connection portion CP1. Each of the second sensing electrodes IE2 may include a second sensor portion SSP2 and a second connection portion CP2.

Each of the first sensor portion SSP1 and the second sensor portion SSP2 may have a rhombic shape, but not being limited thereto. Alternatively, each of the first sensor portion SSP1 and the second sensor portion SSP2 may have another polygonal shape. In an embodiment, the first sensing electrodes IE1 and the second sensing electrodes IE2 may have a shape (for example, a bar shape) without division between the sensor portion and the connection portion.

The first connection portion CP1 connects the first sensor portion SSP1 and a first sensor portion SSP1 adjacent thereto and the second connection portion CP2 connects the second sensor portion SSP2 and a second sensor portion SSP2 adjacent thereto.

The touch driver 210 may be connected to each of the first sensing electrodes IE1 and the second sensing electrodes IE2. The touch driver 210 may include an input sensor 211 and a sensing signal generator 212.

The input sensor 211 may generate a touch driving signal, sequentially provide the touch driving signals to the first sensing electrodes IE1, and sequentially receive the sensing signals from the second sensing electrodes IE2. Capacitances between the first sensing electrodes IE1 and the second sensing electrodes IE2 may be changed by the touch input (e.g., a touch thereon by a finger or a pen) and the changed capacitance may be reflected on the sensing signal and output. The input sensor 211 may sense the touch input (for example, the magnitude and coordinates of the touch input) based on the sensing signal.

The sensing signal generator 212 may calculate the movement speed of the touch input based on the touch input sensed by the input sensor 211, and determine whether or not the movement speed exceeds the reference speed. When the movement speed exceeds the reference speed, the sensing signal generator 212 may generate the sensing signal DS and provide the sensing signal DS to the processor 300.

Hereinafter, operation of the sensing signal generator 212 will be described in detail with reference to FIG. 8.

Figure 8:
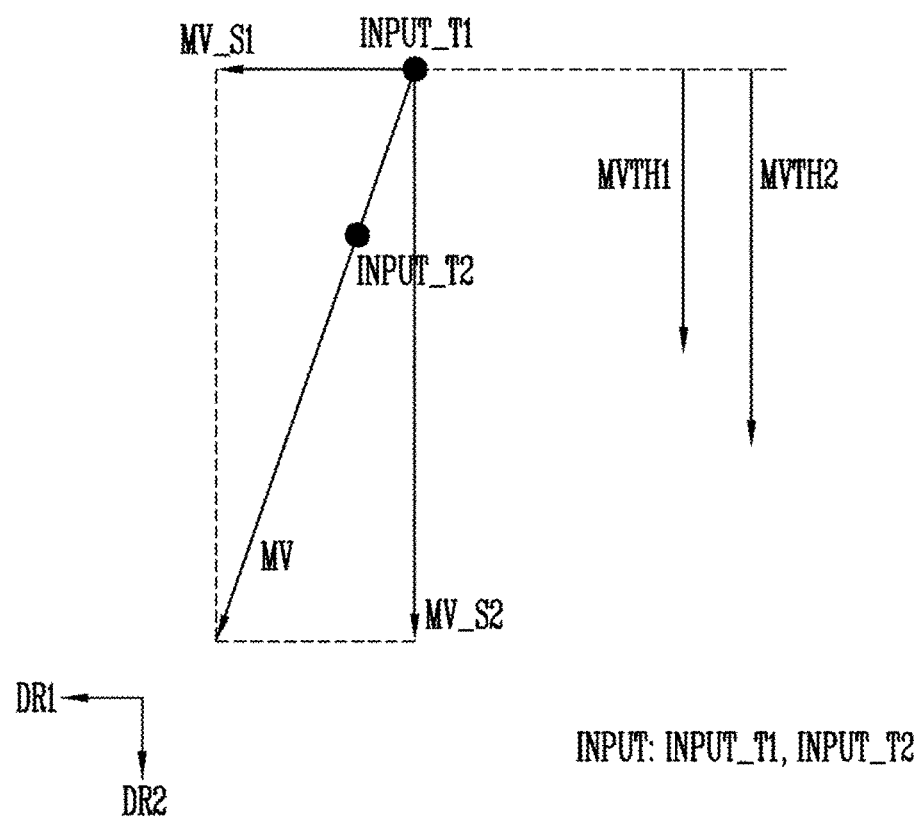
FIG. 8 is a diagram showing an operation of a touch driver included in the display device of FIG. 7.

FIG. 8 is a diagram showing an operation of the touch driver included in the display device of FIG. 7.

Referring to FIGS. 7 and 8, the touch driver 210 (or the sensing signal generator 212) may calculate a movement speed MV of a touch input based on continuously sensed touch inputs INPUT_T1 and INPUT_T2.

In one embodiment, for example, the touch driver 210 may calculate the movement speed MV of the a touch input based on a first touch input INPUT_T1 sensed at a first time point (or a center point of the touch input sensed at the first time point) and a second touch input INPUT_T2 sensed at a second time point.

In an embodiment, the touch driver 210 may calculate the movement speed of the touch input in the first direction DR1, that is, a first movement speed MV_S1 and the movement speed in the second direction DR2, that is, a second movement speed MV_S2. Here, the first direction DR1 may be parallel to the direction in which the scan lines SL1 to SLn are arranged, and the second direction DR2 may be perpendicular to the direction in which the scan lines SL1 to SLn are arranged, as described above with reference to FIG. 5.

In an embodiment, the touch driver 210 may determine whether or not the second movement speed MV_S2 of the touch input is greater than the first movement speed MV_S1. When the first movement speed MV_S1 is greater than the second movement speed MV_S2, the touch input may be recognized as a screen change (or screen scroll) in the first direction DR1.

In an embodiment, the touch driver 210 may determine whether or not the second movement speed MV_S2 is greater than reference speeds MVTH1 and MVTH2.

In one embodiment, for example, when the second movement speed MV_S2 is greater than a first reference speed MVTH1, the touch input may be recognized as a screen change (or screen scroll) in the second direction DR2. In such an embodiment, the touch driver 210 may generate the sensing signal DS and provide the sensing signal DS to the processor 300. The processor 300 may increase the porch period in the frame period and reduce the display period in the frame period while maintaining a duration of the frame period (e.g., maintaining a frame frequency, or a refresh rate of frame images, for example, 60 hertz (Hz)).

In one embodiment, for example, when the second movement speed MV_S2 is greater than the second reference speed MVTH2, the touch driver 210 may generate the sensing signal DS and provide the sensing signal DS to the processor 300. The processor 300 may reduce the display period in the frame period while reducing the time duration of the frame period (for example, increasing the frame frequency or the refresh rate from 60 Hz to 70 Hz).

Figure 9:
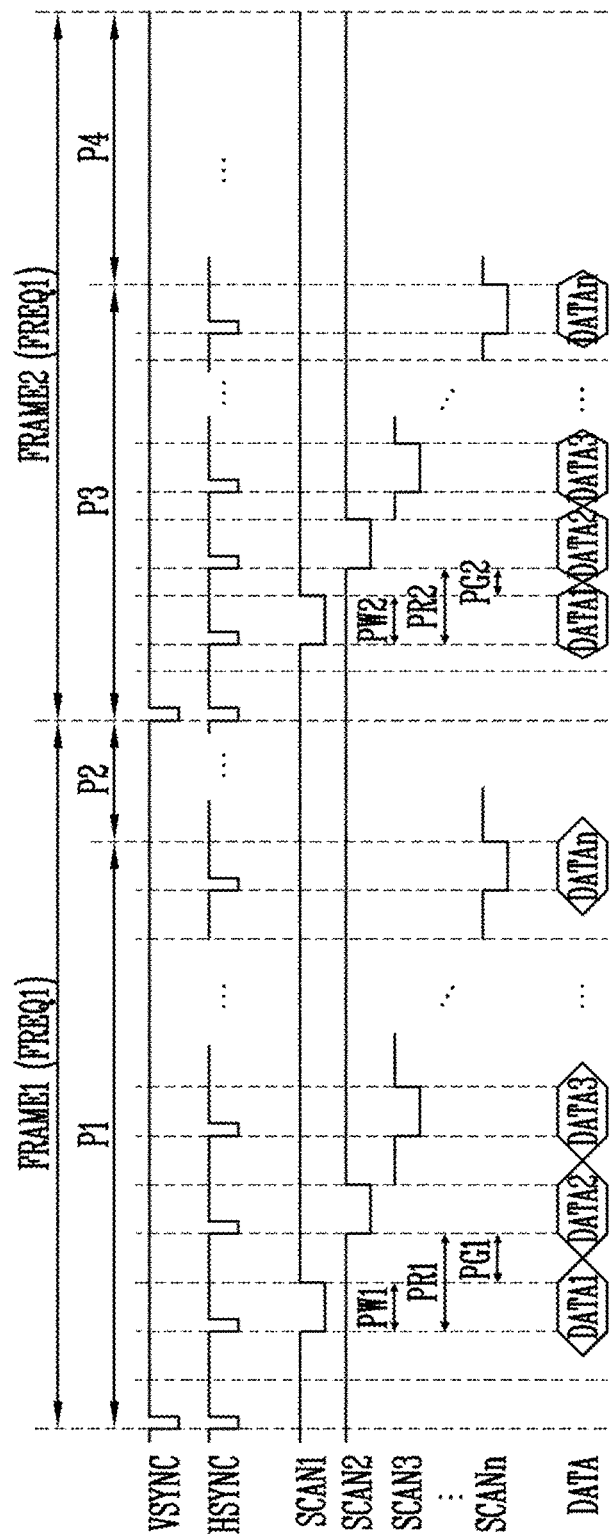
FIG. 9 is a signal timing diagram illustrating an exemplary embodiment of signals in the display device of FIG. 3.

FIG. 9 is a signal timing diagram illustrating an exemplary embodiment of signals in the display device of FIG. 3.

In FIG. 9, the vertical synchronization signal VSYNC, the horizontal synchronization signal HSYNC, the scan signals SCAN1 to SCANn, and the data signal DATA in the display device 100 are shown. The first scan signal SCAN1 may be provided to the first scan line SL1, the second scan signal SCAN2 may be provided to the second scan line SL2, the third scan signal SCAN3 may be provided to the third scan line SL3, and the n-th scan signal SCANn may be provided to the n-th scan line SLn.

In a first frame period FRAME1, the display device 100 may operate in a first mode (or a normal mode). In one embodiment, for example, when the movement speed of the touch input is less than the reference speed, the display device 100 may operate in the first mode.

In the second frame period FRAME2, the display device 100 may operate in a second mode (or a variable mode). In one embodiment, for example, when the movement speed of the touch input is greater than the reference speed, the display device 100 may operate in the second mode for a specific period.

Each of the frame periods FRAME1 and FRAME2 may include the display period and the porch period. Here, the display period may be defined as a period (time duration) in a frame period when an effective data signal is provided to the display portion DISP (refer to FIG. 3) or a period in a frame period when the scan signals SCAN1 to SCANn and the data signal DATA are provided to the display portion DISP. The porch period (or a blank period) may be a period in a frame period between an end time point of a display period and a start time point of a next display period. In one embodiment, for example, the first frame period FRAME1 may include a first period P1 as the display period and a second period P2 as the porch period. In such an embodiment, the second frame period FRAME2 may include a third period P3 as the display period and a fourth period P4 as the porch period.

The vertical synchronization signal VSYNC may include a pulse (for example, a pulse having a logic low level) and may indicate a start of frame data (that is, data corresponding to a frame period in which one frame image is displayed).

In an embodiment, a period of the vertical synchronization signal VSYNC may be regularly maintained or fixed. In such an embodiment, a size (or a temporal width) of the second frame period FRAME2 may be equal to a size (or a temporal width) of the first frame period FRAME1. In one embodiment, for example, each of a refresh rate of a frame image (or frame images corresponding to frame periods including the first frame period FRAME1) corresponding to the first frame period FRAME1 and a refresh rate of a frame image corresponding to the second frame period FRAME2 may be a first frequency FREQ1 (for example, 60 Hz). In such an embodiment, even though the movement speed of the touch input is greater than the reference speed, the refresh rate (a frame frequency, or a driving frequency) may be regularly or constantly maintained or fixed.

The horizontal synchronization signal HSYNC may include a pulse (for example, a pulse having a logic low level) and may indicate a start of a data row (that is, one data row of a plurality of data rows included in the frame data). The scan signals SCAN1 to SCANn and the data signal DATA (or the data signals DATA1 to DATAn) may be synchronized with the horizontal synchronization signal HSYNC. The data signals (DATA1 to DATAn) may be sequentially provided through one data line.

In an embodiment, a second period PR2 (or a second horizontal period) of the horizontal synchronization signal HSYNC in the second frame period FRAME2 may be less than a first period PR1 (or a first horizontal period) of the horizontal synchronization signal HSYNC in the first frame period FRAME1. The second period PR2 may be within a range of about 80% to about 90% of the first period PR1. The first and second periods PR1 and PR2 may be changed according to the refresh rate and the number of scan lines. In one embodiment, for example, the first period PR1 may be about 10.68 microseconds (µs) and the second period PR2 may be about 9.25 µs.

As shown in FIG. 9, in the first frame period FRAME1, the scan signals SCAN1 to SCANn may be sequentially provided to the scan lines based on the first period PR1. In the second frame period FRAME2, the scan signals SCAN1 to SCANn may be sequentially provided to the scan lines based on the second period PR2. In such an embodiment, the data signals DATA1 to DATAn may be provided to the data lines based on the second period PR2. In such an embodiment, a switching speed of the data signal DATA applied to one data line may be relatively increased.

Therefore, a total time during which the scan signals SCAN1 to SCANn and the data signal DATA are provided in the second frame period FRAME2, that is, a third period P3 (the display period, or the active period) may be less than a total time during which the scan signals SCAN1 to SCANn and the data signal DATA are provided in the first frame period FRAME1, that is, a first period P1. In one embodiment, for example, the third period P3 may be within a range of about 80% to 90% of the first period P1 (or the reference time). Therefore, in the second frame period FRAME2, the data signal DATA1 may be updated more quickly and one complete frame image may be displayed more quickly than in the first frame period FRAME1.

In an embodiment, a second pulse width PW2 of each of the scan signals SCAN1 to SCANn in the second frame period FRAME2 may be equal to a first pulse width PW2 of each of the scan signals SCAN1 to SCANn in the first frame period FRAME1. In such an embodiment, in the second frame period FRAME2, the data signal DATA may be stably recorded in the pixels PXL (refer to FIG. 5), and the pixels PXL may emit light at a desired luminance.

Since the second pulse width PW2 is not varied and is constantly maintained while the second period PR2 is relatively reduced, a second interval PG2 between the pulses of the scan signals SCAN1 to SCANn in the second frame period FRAME2 may be less than a first interval PG1 between the pulses of the scan signals SCAN1 to SCANn in the first frame period FRAME1.

In such an embodiment, since the period (or the refresh rate) of the vertical synchronization signal VSYNC is not changed, the porch period may be increased as the display period is reduced. That is, the fourth period P4 of the second frame period FRAME2 may be greater than the second period P2 of the first frame period FRAME1. In one embodiment, for example, the second period P2 may be about 8 times the first period PR1 and the fourth period P4 may be about 248 times the second period PR2.

In an embodiment, as described with reference to FIG. 9, when the movement speed of the touch input exceeds the reference speed (for example, when the second movement speed MV_S2 described with reference to FIG. 8 exceeds the first reference speed MVTH1, the period of the horizontal synchronization signal HSYNC may be reduced, the display period in the frame period may be reduced, and the porch period in the frame period may be increased. In such an embodiment, as the display period in the frame period is reduced, the data signal may be updated or switched more quickly during one frame period, and one complete frame image may be displayed more quickly. Therefore, the screen abnormality visually recognized by the user in a screen switching or dragging process may be effectively prevented or alleviated.

In such an embodiment, the vertical synchronization signal VSYNC and the refresh rate may be regularly maintained or fixed. Thus, an increase of power consumption of the display device 100 may be minimized. In one embodiment, for example, when the refresh rate is increased by 10%, an increase rate of the power consumption of the display device 100 may be within about 10% to about 15%. When only the display period is decreased while fixing the refresh rate, the increase rate of the power consumption of the display device 100 may be about 5% or less.

Figure 10:
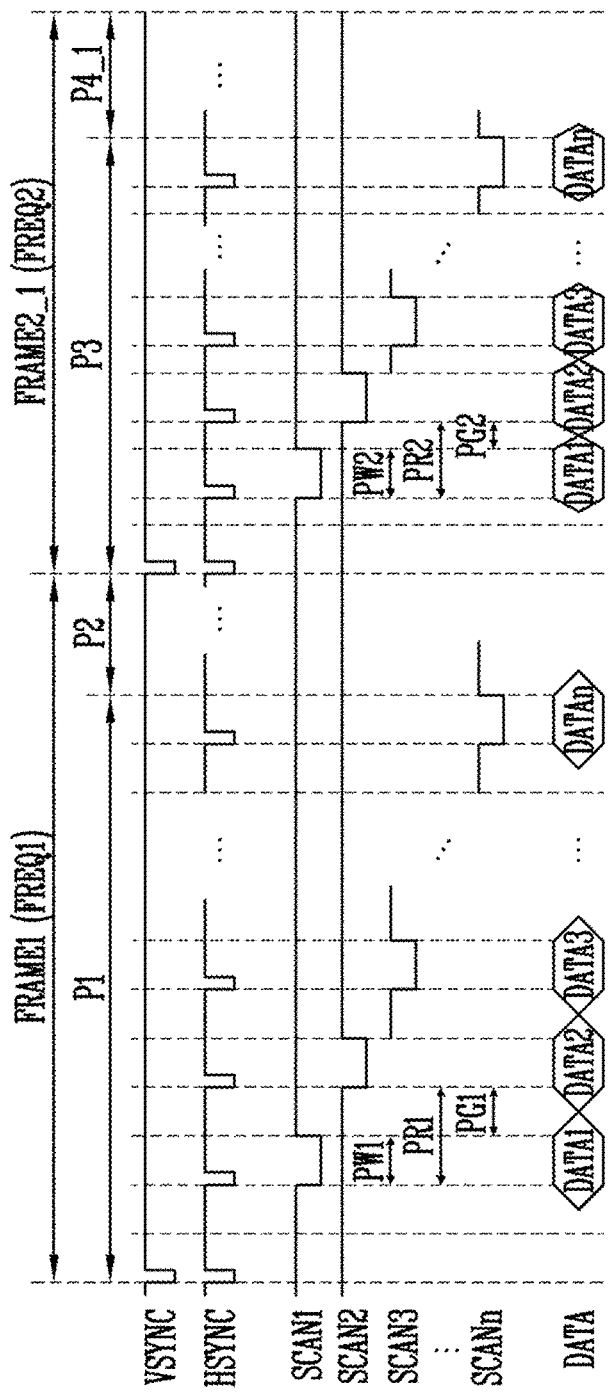
FIG. 10 is a signal timing diagram illustrating an alternative exemplary embodiment of the signals in the display device of FIG. 3.

FIG. 10 is a signal timing diagram illustrating an alternative exemplary embodiment of the signals in the display device of FIG. 3. In FIG. 10, signals corresponding to the signals shown in FIG. 9 are shown.

Referring to FIGS. 9 and 10, in a second frame period FRAME2_1, the display device 100 may operate in the second mode. In one embodiment, for example, when the movement speed of the touch input is greater than the reference speed, the display device 100 may operate in the second mode for a specific period.

The period of the vertical synchronization signal VSYNC in the second frame period FRAME2_1 may be less than the period of the vertical synchronization signal VSYNC in the first frame period FRAME1. Therefore, a size (or a temporal width) of the second frame period FRAME2_1 may less than the size (or a temporal width) of the first frame period FRAME1, and a refresh rate (or a second frequency FREQ2, for example, 70 Hz) of a frame image corresponding to the second frame period FRAME2_1 may be greater than the refresh rate (or the first frequency FREQ1, for example, 60 Hz) of the frame image corresponding to the first frame period FRAME1.

In such an embodiment, as described above with reference to FIG. 9, the second period PR2 of the horizontal synchronization signal HSYNC in the second frame period FRAME2_1 may be less than the first period PR1 of the horizontal synchronization signal HSYNC in the first frame period FRAME1. Therefore, a total time during which the scan signals SCAN1 to SCANn and the data signal DATA are provided in the second frame period FRAME2_1, that is, the third period P3 (the display period, or the active period), may be less than the total time during which the scan signals SCAN1 to SCANn and the data signal DATA are provided in the first frame period FRAME1, that is, the first period P1. Thus, in the second frame period FRAME2_1, the data signal DATA may be updated more quickly, and one complete frame image may be displayed more quickly.

In such an embodiment, a fourth period P4_1 of the second frame period FRAME2_1 may be equal to or less than the second period P2 of the first frame period FRAME1. As the fourth period P4_1 is less, the frame rate of the frame images corresponding to the second frame period FRAME2_1 may be increased. In such an embodiment, a switching width (or a movement width) between the frame images may be reduced. Therefore, the screen abnormality visually recognized by the user in the screen switching process may be effectively prevented or alleviated, and more natural screen switching may be achieved.

Figure 11:
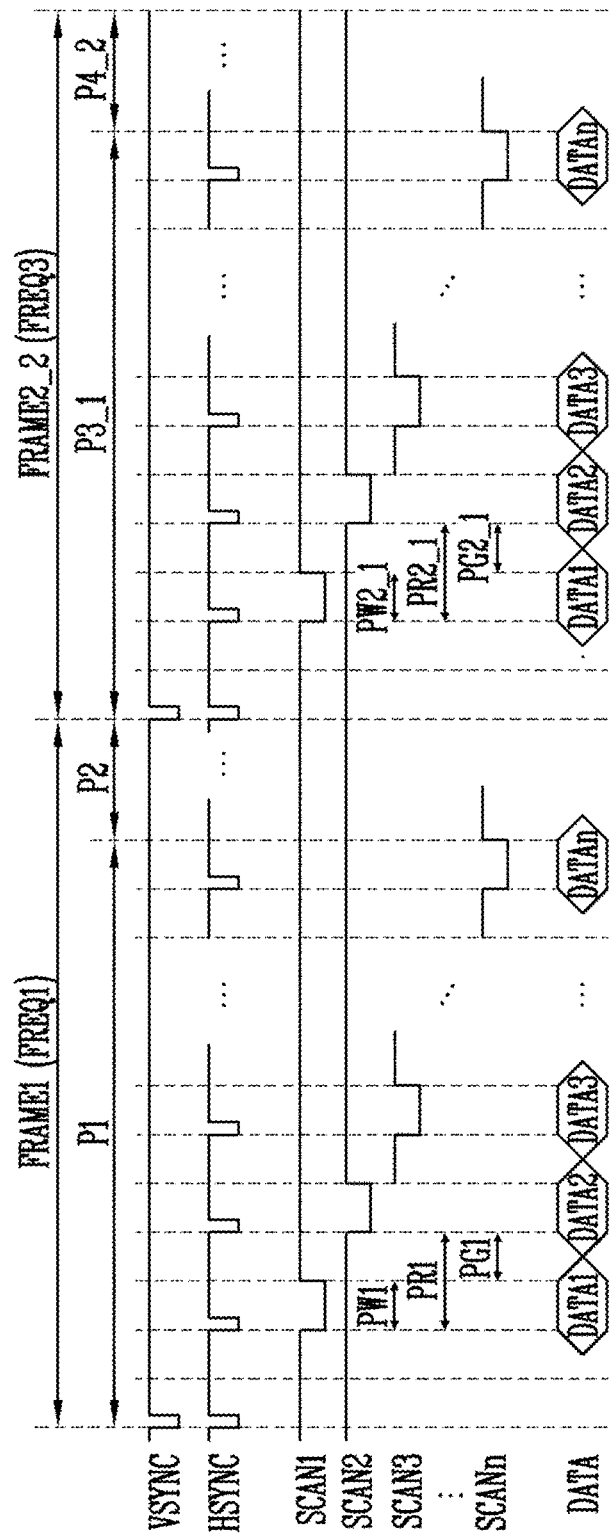
FIG. 11 is a signal timing diagram illustrating another alternative exemplary embodiment of the signals measured in the display device of FIG. 3.

FIG. 11 is a signal timing diagram illustrating another alternative exemplary embodiment of the signals in the display device of FIG. 3. In FIG. 11, signals corresponding to the signals shown in FIG. 9 are shown.

Referring to FIGS. 9 and 11, in a second frame period FRAME2_2, the display device 100 may operate in the second mode. In one embodiment, for example, when the movement speed of the touch input is greater than the reference speed, the display device 100 may operate in the second mode for a specific period.

The period of the vertical synchronization signal VSYNC in the second frame period FRAME2_2 (the frame period in the second mode) may be less than the period of the vertical synchronization signal VSYNC in the first frame period FRAME1. Therefore, a size (or a temporal width) of the second frame period FRAME2_2 may less than the size (or temporal width) of the first frame period FRAME1, and a refresh rate (or a third frequency FREQ3, for example, 70 Hz) of a frame image corresponding to the second frame period FRAME2_2 may be greater than the refresh rate (or the first frequency FREQ1, for example, 60 Hz) of the frame image.

A second period PR2_1 of the horizontal synchronization signal HSYNC in the second frame period FRAME2_2 may be the same as a first period PR1_1 of the horizontal synchronization signal HSYNC in the first frame period FRAME1. Therefore, a total time during which the scan signals SCAN1 to SCANn and the data signal DATA are provided in the second frame period FRAME2_2, that is, a third period P3_1 (the display period, or the active period) may be equal to the total time during which the scan signals SCAN1 to SCANn and the data signal DATA are provided in the first frame period FRAME1, that is, the first period P1.

In such an embodiment, second pulse widths PW2_1 of each of the scan signals SCAN1 to SCANn in the second frame period FRAME2_2 may be the same as first pulse widths PW1 of each of the scan signals SCAN1 to SCANn in the first frame period FRAME1. In such an embodiment, a second interval PG2_1 between the pulses of the scan signals SCAN1 to SCANn in the second frame period FRAME2_2 may be the same as the first interval PG1 between the pulses of the scan signals SCAN1 to SCANn in the first frame period FRAME1.

In an embodiment, a fourth period P4_2 of the second frame period FRAME2_2 may be equal to or less than the second period P2 of the first frame period FRAME1. As the fourth period P4_2 is less, the frame rate of the frame images corresponding to the second frame period FRAME2_1 may be increased. In such an embodiment, the switching width (or movement width) between the frame images may be reduced. Therefore, the screen abnormality visually recognized by the user in the screen switching process may be effectively prevented or alleviated, and more natural screen switching may be achieved.

Figure 12:
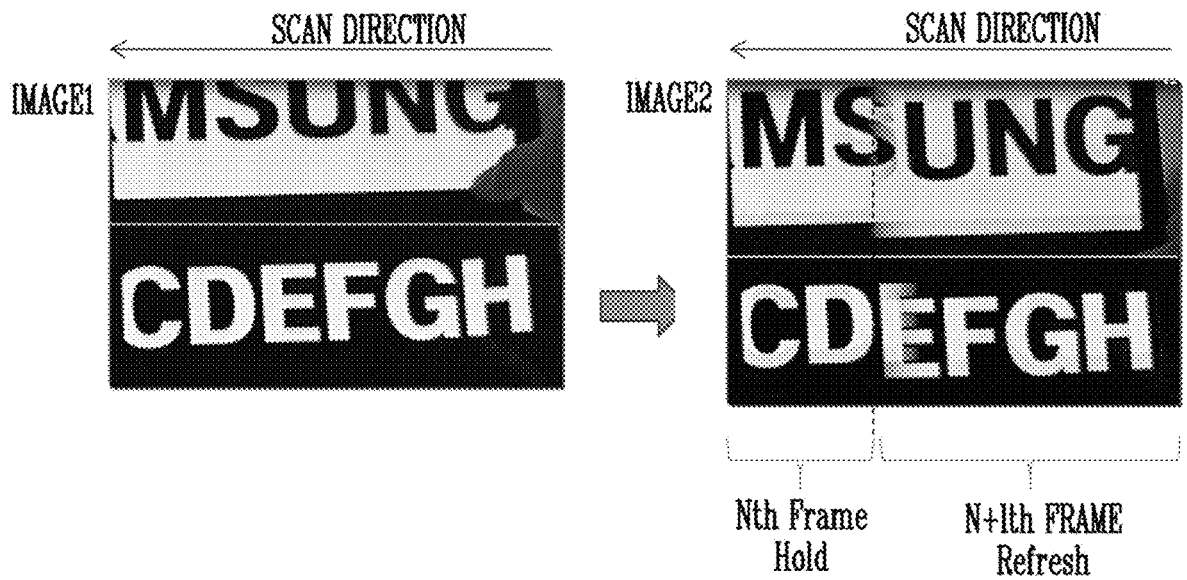
FIG. 12 is a diagram illustrating an exemplary embodiment of an image displayed on the display device of FIG. 3.

FIG. 12 is a diagram illustrating an exemplary embodiment of the image displayed on the display device of FIG. 3. FIG. 12 exemplarily illustrates the screen abnormality (for example, a screen drag) occurring in a switching process between the frame images when the movement speed of the touch input exceeds the reference speed.

Referring to FIGS. 3, 5, 9, and 12, as the scan lines SL1 to SLn are arranged along the first direction DR1, the scan signals may be sequentially provided to the display portion DISP).

A first image IMAGE1 indicates one frame image without touch input.

A second image IMAGE2 indicates an image at a time point at which an N-th (N is a positive integer) frame image is switched (or updated) to an (N+1)-th frame image according to a scroll input in the second direction DR2 (that is, a touch input instructing a screen movement in the second direction DR2).

As the display device 100 operates in a sequential driving method, the frame images may be sequentially updated along a scan direction (that is, the first direction DR1). Therefore, the N-th frame image may be displayed in a part of a left side of the second image IMAGE2, the (N+1)-th frame image may be displayed in a part of a right side of the second image IMAGE2, and a boundary between a held N-th frame image and a refreshed (N+1)-th frame image may be shown discontinuously.

When a length of the second image IMAGE2 in the second direction DR2 is narrow, since an image (for example, a discontinuous portion between the N-th frame image and the (N+1)-th frame image) provided to the user for the scroll input in the second direction DR2 is small, the user may not recognize the screen drag.

However, as described with reference to FIGS. 1 and 5, since the second driver 130 for generating the scan signal is disposed adjacent to the short side (for example, the first and second short sides SS1 and SS2, (refer to FIG. 1)), a length of the second image IMAGE2 in the second direction DR2 is relatively long, the image (for example, the discontinuous portion between the N-th frame image and the (N+1)-th frame image) provided to the user for the scroll input in the second direction DR2 may be increased, and the screen drag may be visually recognized by the user.

In such embodiment, when the scroll input in the second direction DR2 occurs, the display device 100 may update the frame image more quickly by increasing the porch period and reduce the display period in the frame period. Thus, the screen abnormality visually recognized by the user in the screen switching process may be effectively prevented or alleviated.

Figure 13:
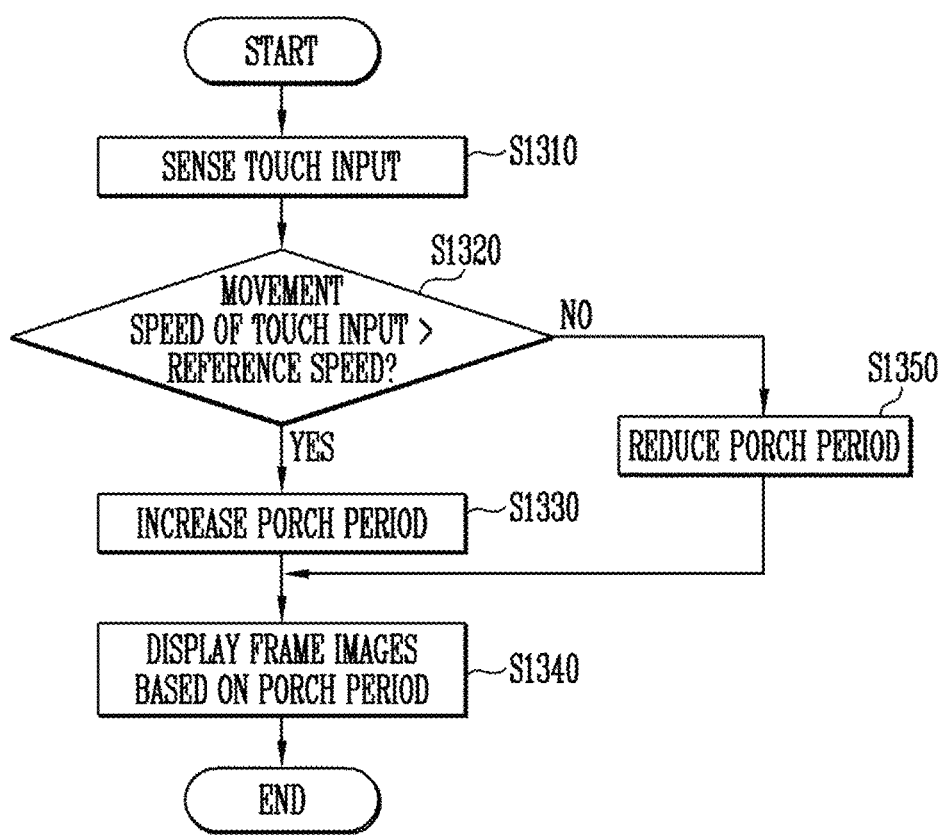
FIG. 13 is a flowchart illustrating a method of driving a display device according to an embodiment of the disclosure.

FIG. 13 is a flowchart illustrating a method of driving a display device according to an embodiment of the disclosure.

Referring to FIGS. 3 and 13, the method of FIG. 13 may be performed in the display device 100 of FIG. 3.

The method of FIG. 13 may including sensing the touch input through the touch driver 210 (S1310).

When the touch input is sensed, in the method of FIG. 13, e the movement speed of the touch input may be calculated by the touch driver 210 and whether or not the movement speed of the touch input is greater than the reference speed is determined (S1320).

As described with reference to FIG. 8, the method of FIG. 13 may include calculating the movement speed in the second direction DR2 (that is, the second movement speed MV_S2, refer to FIG. 8) perpendicular to the first direction DR1.

In such an embodiment, the method of FIG. 13 may include increasing the porch period included in the frame period in which one frame image is displayed through the processor 300 (S1330) when the movement speed of the touch input is greater than the reference speed.

In such an embodiment, as described with reference to FIG. 9, the porch period may be the period between the end time point of the display period and the start time point of the next display period.

The width of the frame period (or the refresh rate of the frame images) may be constantly maintained or fixed. In such an embodiment, since the porch period is increased, the display period may be reduced. That is, the method of FIG. 13 may include reducing the update time of the frame data corresponding to each of the frame images.

Thereafter, the method of FIG. 13 may include displaying the frame image on the display portion DISP based on the increased porch period (S1340).

In such an embodiment, the method of FIG. 13 may include reducing the porch period included in the frame period in which one frame image is displayed through the processor 300 (S1350) when the movement speed of the touch input is less than the reference speed.

In one embodiment, for example, the method of FIG. 13 may include reducing the porch period when the porch period is increased as compared with the second period P2 as described above with reference to FIG. 9 or equal to the fourth period P4. In one alternative embodiment, for example, the method of FIG. 13 may include maintaining the width of the porch period as it is when the porch period is the same as the second period P2 described above with reference to FIG. 9.

In an embodiment, as described with reference to FIG. 9, the method of FIG. 13 may include providing the scan signals to the display portion DISP with a shorter period (for example, the second period PR2) through the second driver 130, and providing the data signal to the display portion DISP by switching the data signal with a shorter period through the first driver 120.

In such an embodiment, as the display period in the frame period is reduced, the data signal may be updated or switched more quickly during one frame period, and one complete frame image may be displayed more quickly. Therefore, the screen abnormality visually recognized by the user in the screen switching process may be effectively prevented or alleviated.

In an embodiment, since the width of the frame period or the refresh rate of the frame images is constantly maintained or fixed, an increase of the power consumption of the display device may be minimized.

Figure 14:
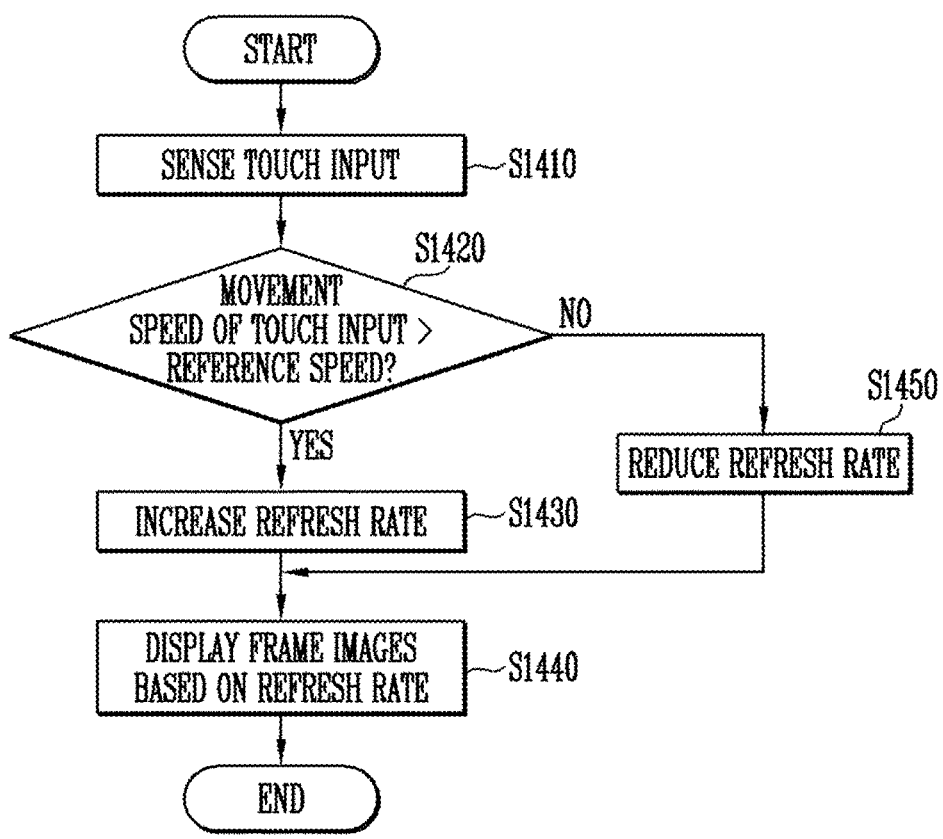
FIG. 14 is a flowchart illustrating a method of driving a display device according to an alternative embodiment of the disclosure.

FIG. 14 is a flowchart illustrating a method of driving a display device according to an alternative embodiment of the disclosure.

Referring to FIGS. 3 and 14, the method of FIG. 14 may be performed in the display device 100 of FIG. 3.

The method of FIG. 14 may include sensing the touch input through the touch driver 210 (S1410).

In such an embodiment, the method of FIG. 14 may include calculating the movement speed of the touch input through the touch driver 210 when the touch input is sensed and determining whether or not the movement speed of the touch input is greater than the reference speed (S1420).

In such an embodiment, as described with reference to FIG. 8, the method of FIG. 14 may include calculating the movement speed in the second direction DR2 (that is, the second movement speed MV_S2, refer to FIG. 8) perpendicular to the first direction DR1.

In such an embodiment, the method of FIG. 14 may include increasing the refresh rate of the frame images through the processor 300 (S1430) when the movement speed of the touch input is greater than the reference speed.

In one embodiment, for example, as described with reference to FIG. 10, the method of FIG. 14 may include reducing the display period and maintaining or reducing the width of the porch period. In one alternative embodiment, for example, as described with reference to FIG. 11, the method of FIG. 14 may include maintaining the width of the display period and reducing the width of the porch period.

Thereafter, the method of FIG. 14 may include displaying the frame image on the display portion DISP based on the increased refresh rate (S1440).

In such an embodiment, the method of FIG. 14 may further include reducing the refresh rate of the frame images through the processor 300 (S1450) when the movement speed of the touch input is less than the reference speed.

In one embodiment, for example, the method of FIG. 14 may include increasing the refresh rate when the refresh rate is increased as compared with the first frequency FREQ1 described with reference to FIG. 10 or equal to the second frequency FREQ2. In one alternative embodiment, for example, the method of FIG. 14 may include maintaining the refresh rate as it is when the refresh rate is equal to the first frequency (FREQ1) described with reference to FIG. 10.

As the refresh rate of the frame images increases, the switching width (or movement width) between the frame images may be reduced.

Therefore, the screen abnormality visually recognized by the user in the screen switching process may be effectively prevented or alleviated, and more natural screen switching may be achieved.

Figure 15:
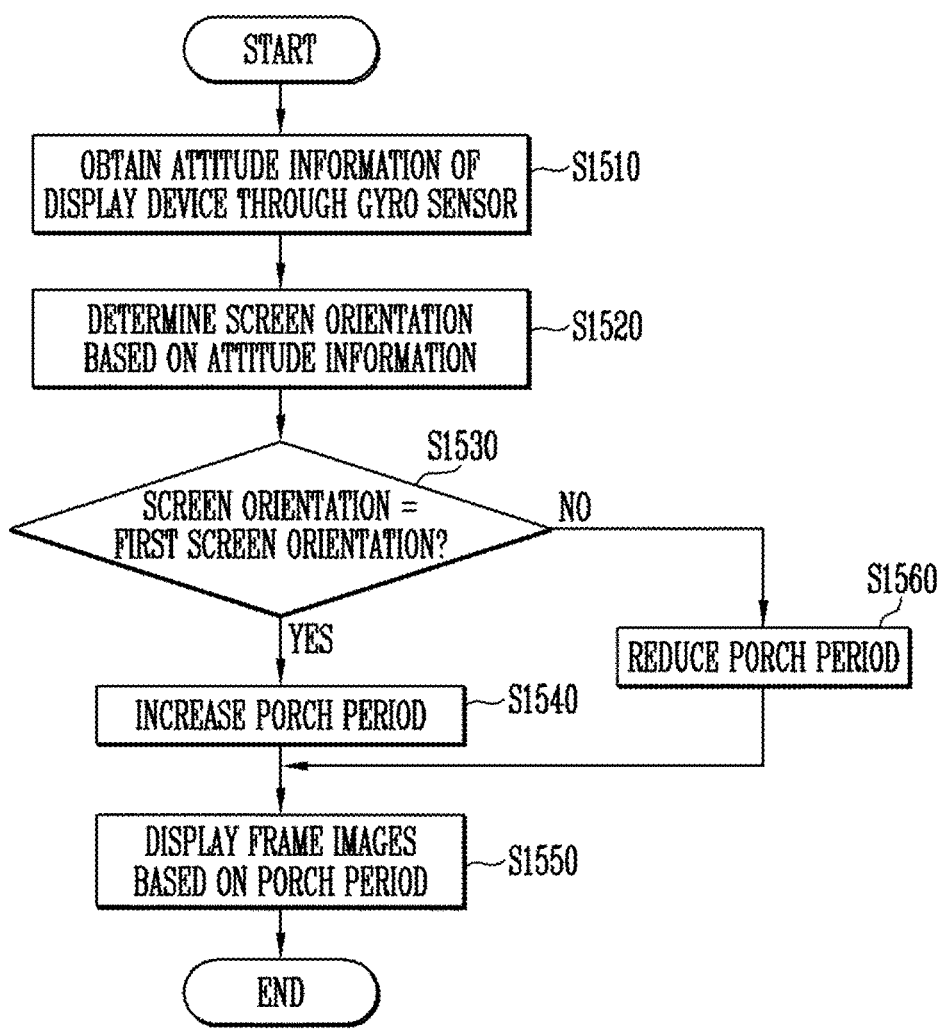
FIG. 15 is a flowchart illustrating a method of driving a display device according to another alternative embodiment of the disclosure.

FIG. 15 is a flowchart illustrating a method of driving a display device according to further another alternative embodiment of the disclosure.

Referring to FIGS. 3 and 15, the method of FIG. 15 may be performed in the display device 100 of FIG. 3.

The method of FIG. 15 may include obtaining the attitude information of the display device 100 through the gyro sensor (or the sensor 400) (S1510).

The method of FIG. 15 may further include determining the screen orientation of the display device 100 based on the attitude information (S1520).

In such an embodiment, as described above, the screen orientation may be a direction in which an image is output based on the display device 100, or a direction from an upper side to a lower side of an image (for example, a character).

When the screen orientation of the display device 100 is the first screen orientation (or the second direction DR2), the display device 100 may operate in the first viewing mode (or the vertical direction viewing mode), and when the screen orientation of the display device 100 is the second screen orientation (or the first direction DR1), the display device 100 may operate in the second viewing mode (or the horizontal direction viewing mode).

The method of FIG. 15 may further include determining whether the screen orientation of the display device 100 is the first screen orientation (or the second screen orientation) (S1530), and when the screen orientation is the first screen orientation, the method of FIG. 15 may include increasing the porch period included in the frame period in which one frame image is displayed through the processor 300 (S1540).

A configuration for increasing the porch period may be substantially the same as the configuration for increasing the porch period described above with reference to FIGS. 9 and 13.

In an embodiment, the display device 100 may operate in the vertical direction viewing mode and a screen (that is, a scroll screen) that is switched or scrolled in the second direction DR2 may be frequently displayed through the display device 100 when the screen orientation of the display device 100 is the first screen orientation. Therefore, when the screen orientation is the first screen orientation, the method of FIG. 15 may effectively prevent or alleviate the screen abnormality visually recognized by the user in the screen switching process (that is, in the process of displaying the scroll screen) by increasing the porch period.

Thereafter, the method of FIG. 15 may include displaying the frame image on the display portion DISP based on the increased porch period (S1550).

In such an embodiment, the method of FIG. 15 may further include reducing the porch period included in the frame period in which one frame image is displayed through the processor 300 (S1560) when the screen orientation of the display device 100 is not the first screen orientation (for example, when the screen orientation of the display device 100 is the second screen orientation).

In one embodiment, for example, the method of FIG. 15 may include reducing the porch period when the porch period is increased as compared with the second period P2 described above with reference to FIG. 9 or equal to the fourth period P4. In one alternative embodiment, for example, the method of FIG. 15 may include maintaining the width of the porch period as it is when the porch period is the same as the second period P2 described with reference to FIG. 9.

When the screen orientation of the display device 100 is the second screen orientation, the display device 100 may operate in the horizontal direction viewing mode, and a situation in which the scroll screen in the second direction DR2 is displayed may rarely occur. Therefore, when the screen orientation is the second screen orientation, the method of FIG. 15 may not perform reducing or varying the porch period.

Thus, in such an embodiment, the screen abnormality visually recognized by the user in the screen switching process may be effectively prevented or alleviated, and the increase of the power consumption of the display device 100 may be minimized.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
a display portion including data lines, scan lines, and pixels connected to the data lines and the scan lines;
a display driver which provides data signals to the data lines and sequentially provides scan signals to the scan lines;
a touch sensing portion including sensing electrodes; and
a touch driver which senses a touch input based on a change of a capacitance between the sensing electrodes and calculates a movement speed of the touch input,
wherein, when the movement speed of the touch input is greater than a reference speed, a first period, in which the scan signals and the data signals are provided, is reduced, in a frame period in which a frame image is displayed, and
a refresh rate of the frame image is constant.

2. The display device according to claim 1, wherein
each of the scan signals is synchronized with a horizontal synchronization signal,
a period of the horizontal synchronization signal is reduced, when the movement speed of the touch input is greater than the reference speed, and
the horizontal synchronization signal defines starts of each of data rows included in frame data corresponding to the frame image.

3. The display device according to claim 2, further comprising:
a processor which generates the horizontal synchronization signal,
wherein the touch driver provides a sensing signal to the processor when the movement speed of the touch input is greater than the reference speed, and
the processor reduces the period of the horizontal synchronization signal based on the sensing signal.

4. The display device according to claim 2, wherein
the first period is within a range of about 80% to 90% of a reference time when the movement speed of the touch input is greater than the reference speed, and
the reference time is a period in which the scan signals and the data signals are provided when the movement speed of the touch input is less than the reference speed.

5. The display device according to claim 2, wherein, when the movement speed of the touch input is greater than the reference speed, a switching speed of the data signals is increased in the frame period.

6. The display device according to claim 1, wherein
the frame period includes a second period between the first period thereof and a first period of an adjacent frame period,
the adjacent frame period is a frame period adjacent to the frame period, and
the second period is increased when the movement speed of the touch input is greater than the reference speed.

7. The display device according to claim 1, wherein
the frame period includes a second period between the first period thereof and a first period of an adjacent frame period,
the adjacent frame period is a frame period adjacent to the frame period, and
the second period is constant or reduced.

8. The display device according to claim 1, wherein
the display portion further comprises light emission control lines,
the display driver sequentially provides light emission control signals to the light emission control lines, and
the pixels are connected to the light emission control lines and sequentially emit light based on the light emission control signals.

9. The display device according to claim 1, wherein
the data lines extend in a first direction and are arranged along a second direction intersecting the first direction,
the scan lines extend in the second direction and are arranged along the first direction, and
the display portion is foldable based on a folding axis extending in the second direction.

10. The display device according to claim 9, wherein
the scan signals are sequentially provided to the scan lines along the first direction, and
the pixels sequentially emit light in response to the scan signals.

11. The display device according to claim 10, wherein
the touch driver calculates the movement speed of the touch input, and
the movement speed is a speed of the touch input in the second direction.

12. A display device comprising:
a display portion including data lines, scan lines, and pixels connected to the data lines and the scan lines, wherein the display portion displays a frame image through the pixels;

a display driver which provides data signals to the data lines and sequentially provides scan signals to the scan lines;

a touch sensing portion including sensing electrodes;

a touch driver which senses a touch input based on a change of a capacitance between the sensing electrodes and generates a sensing signal when a movement speed of the touch input is greater than a reference speed; and a processor which varies a refresh rate of the frame image based on the sensing signal, wherein a frame period, in which the frame image is displayed, includes a first period in which the scan signals and the data signals are provided, and a second period between the first period and a first period of an adjacent frame period, the adjacent frame period is a frame period adjacent to the frame period, and the processor reduces the first period.

13. The display device according to claim 12, wherein the processor reduces the second period.

14. The display device according to claim 12, wherein the scan signals are sequentially provided along a first direction, the touch driver generates the sensing signal when the movement speed of the touch input in a second direction is greater than the reference speed, and the second direction intersects the first direction.

15. A method of driving a display device, the method comprising:

sensing a touch input through a touch sensing portion of the display device;

determining whether or not a movement speed of the touch input is greater than a reference speed through the touch sensing portion;

increasing a porch period when the movement speed of the touch input is greater than the reference speed in a processor while a refresh rate of frame images is constant; and displaying the frame images based on the porch period on a display portion of the display device, wherein the porch period is a period between a time point at which display of a first frame image among the frame images is ended and a time point at which a second frame image adjacent to the first frame image is started to be displayed.

16. The method according to claim 15, wherein the increasing the porch period further comprises reducing an update time of frame data corresponding to each of the frame images.

17. A display device comprising:

a display portion including data lines, scan lines, and pixels connected to the data lines and the scan lines, wherein the display portion displays frame images through the pixels;

a display driver which provides data signals to the data lines and sequentially provides scan signals to the scan lines;

a sensor which generates attitude information by sensing an attitude or a rotation of the display portion; and a processor which varies a porch period of the frame images based on the attitude information, wherein the porch period is a period between a time point at which display of a first frame image among the frame images is ended and a time point at which a second frame image adjacent to the first frame image is started to be displayed.

18. The display device according to claim 17, wherein the processor determines a screen orientation based on the attitude information, and increases the porch period when the screen orientation is a first screen orientation, and the screen orientation is a direction in which an upper portion or a lower portion of each of the frame images is positioned with respect to the display portion.

19. The display device according to claim 18, wherein the scan lines are arranged along a first direction, each of the scan lines extends in a second direction, and the first screen orientation is in the second direction.

\* \* \* \* \*